(12) United States Patent
Alstad

(10) Patent No.: US 11,846,235 B2
(45) Date of Patent: Dec. 19, 2023

(54) SYSTEMS FOR SOUND ATTENUATION

(71) Applicant: HONEYWELL INTERNATIONAL INC., Charlotte, NC (US)

(72) Inventor: Shawn Alstad, Phoenix, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 268 days.

(21) Appl. No.: 17/443,492

(22) Filed: Jul. 27, 2021

(65) Prior Publication Data

US 2023/0033240 A1 Feb. 2, 2023

(51) Int. Cl.
*F02C 7/24* (2006.01)
*F02K 1/82* (2006.01)
*G10K 11/04* (2006.01)
*G10K 11/16* (2006.01)

(52) U.S. Cl.
CPC .............. *F02C 7/24* (2013.01); *F02K 1/827* (2013.01); *G10K 11/04* (2013.01); *G10K 11/16* (2013.01); *F05D 2260/96* (2013.01)

(58) Field of Classification Search
CPC . B64D 2033/0206; F02K 1/827; F02C 7/045; F02C 7/24; G10K 11/172; G10K 11/175
See application file for complete search history.

(56) References Cited

U.S. PATENT DOCUMENTS

| | | | |
|---|---|---|---|
| 1,329,559 A | 2/1920 | Tesla | |
| 5,785,919 A | 7/1998 | Wilson | |
| 9,476,359 B2 | 10/2016 | Soria et al. | |
| 9,732,677 B1 | 8/2017 | Chien et al. | |
| 9,909,471 B2 | 3/2018 | Mattia | |
| 10,634,059 B2 | 4/2020 | Rami et al. | |
| 10,851,713 B2 | 12/2020 | Roach et al. | |
| 2015/0344142 A1 | 12/2015 | Roach et al. | |
| 2019/0185171 A1 | 6/2019 | Gakhar et al. | |
| 2019/0264637 A1 | 8/2019 | Cariou | |
| 2019/0270504 A1 | 9/2019 | Cedar et al. | |
| 2020/0200084 A1 | 6/2020 | Desjoyeaux et al. | |
| 2020/0239125 A1* | 7/2020 | Prakash | B64C 1/40 |
| 2021/0277828 A1* | 9/2021 | Alstad | F02C 7/24 |

* cited by examiner

*Primary Examiner* — Jeremy A Luks

(74) *Attorney, Agent, or Firm* — LORENZ & KOPF, LLP

(57) ABSTRACT

A sound attenuating cell includes a first sound attenuating cavity defined between a first sidewall and a second sidewall. The first sidewall is opposite the second sidewall. The first sidewall includes a first undulating surface and the second sidewall includes a second undulating surface. A deflector is coupled to the first undulating surface. The deflector extends from the first undulating surface toward the second undulating surface. The first undulating surface is axially offset from the second undulating surface to define a tortuous path between the first sidewall and the second sidewall. The first sound attenuating cavity has a first end and a second end. The first end is opposite the second end, and an inlet and an outlet of the first sound attenuating cavity is defined at the first end. The sound attenuating cell includes a second sound attenuating cavity nested within the first sound attenuating cavity.

19 Claims, 15 Drawing Sheets

SYSTEMS FOR SOUND ATTENUATION

TECHNICAL FIELD

The present disclosure generally relates to sound attenuation, and more particularly relates to a system for sound attenuation that includes at least one sound attenuation cell for a sound attenuation panel.

BACKGROUND

Gas turbine engines may be employed to power various devices. For example, a gas turbine engine may be employed to propel or supply power to a mobile platform, such as an aircraft. The operation of the gas turbine engine to propel the aircraft may result in the generation of noise that is undesirable for passengers and crew while the aircraft is in flight. In addition, the gas turbine engine may run while the aircraft is on the ground to supply power to the aircraft. In these instances, noise generated by the gas turbine engine may be undesirable to one or more passengers or crew onboard the aircraft and service personnel outside.

Accordingly, it is desirable to provide systems for sound attenuation, for reducing the noise experienced by passengers, crew and service personnel, for example, during the operation of the gas turbine engine. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a sound attenuating cell. The sound attenuating cell includes a first sound attenuating cavity defined between a first sidewall and a second sidewall. The first sidewall is opposite the second sidewall. The first sidewall includes a first undulating surface and the second sidewall includes a second undulating surface. A deflector is coupled to the first undulating surface. The deflector extends from the first undulating surface toward the second undulating surface. The first undulating surface is axially offset from the second undulating surface to define a tortuous path between the first sidewall and the second sidewall. The first sound attenuating cavity has a first end and a second end. The first end is opposite the second end, and an inlet and an outlet of the first sound attenuating cavity is defined at the first end. The sound attenuating cell includes a second sound attenuating cavity nested within the first sound attenuating cavity.

The deflector includes a first deflector end and a second deflector end. The first deflector end is coupled to the first undulating surface and the first deflector end defines a plurality of openings spaced apart about a periphery of the first deflector end. The deflector is cantilevered relative to the first undulating surface and the second deflector end extends toward the second undulating surface. The first undulating surface includes a plurality of first undulations, a plurality of first valleys and a plurality of first sloped surfaces that alternate to define the first undulating surface, and the deflector is coupled to at least one first valley of the plurality of first valleys of the first undulating surface. The sound attenuating cell includes a perforated facesheet coupled to the first end. The first sound attenuating cavity and the second sound attenuating cavity extend about a longitudinal axis of the sound attenuating cell. The second sound attenuating cavity has a third end and a fourth end, the third end opposite the fourth end, and a second inlet and a second outlet are defined at the third end. The sound attenuating cell includes a perforated backsheet coupled to at least a portion of the second end of the first sound attenuating cavity and the fourth end of the second sound attenuating cavity. The sound attenuating cell includes a plurality of walls that cooperate to surround the first sound attenuating cavity and the second sound attenuating cavity, with a base wall coupled to each of the plurality of walls, and the backsheet is coupled to the portion of the second end of the first sound attenuating cavity and the fourth end of the second sound attenuating cavity such that a chamber is defined between the backsheet and the base wall. The backsheet is coupled to the portion of the second end of the first sound attenuating cavity and the fourth end of the second sound attenuating cavity to extend along an axis that is transverse to the longitudinal axis of the sound attenuating cell to define the chamber. The first sound attenuating cavity and the second sound attenuating cavity are substantially symmetric about a longitudinal axis of the sound attenuating cell. The sound attenuating cell includes a third sound attenuating cavity nested within the second sound attenuating cavity. A length of the first sound attenuating cavity and the second sound attenuating cavity varies about a perimeter of the sound attenuating cell. The first sidewall of the first sound attenuating cavity defines a perimeter of the sound attenuating cell. The second end of the first sound attenuating cavity is closed, the second sound attenuating cavity has a third end and a fourth end, the third end opposite the fourth end and the fourth end is closed such that a second inlet and a second outlet of the second sound attenuating cavity is defined at the third end. The sound attenuating cell includes at least one partition that extends through at least the first sound attenuating cavity and the second sound attenuating cavity.

Also provided is a sound attenuating panel for a gas turbine engine. The sound attenuating panel includes at least one sound attenuating cell. The at least one sound attenuating cell includes a perforated facesheet, a first sound attenuating cavity defined between a first sidewall and a second sidewall, with the first sidewall opposite the second sidewall. The first sidewall includes a first undulating surface and the second sidewall includes a second undulating surface. A deflector is coupled to the first undulating surface that extends from the first undulating surface toward the second undulating surface, and the first undulating surface is axially offset from the second undulating surface to define a tortuous path between the first sidewall and the second sidewall. The first sound attenuating cavity has a first end coupled to the facesheet and a second end, the first end is opposite the second end, and an inlet and an outlet are each defined at the facesheet. A second sound attenuating cavity is nested within an inner perimeter of the first sound attenuating cavity, and the second sound attenuating cavity having a second inlet and a second outlet defined at the facesheet.

The deflector is cantilevered relative to the first undulating surface. The deflector includes a first deflector end and a second deflector end. The first deflector end is coupled to the first undulating surface, and the first deflector end defines a plurality of openings spaced apart about a periphery of the first deflector end. The sound attenuating panel of claim 17, wherein the at least one sound attenuating cell includes a plurality of walls that cooperate to surround the first sound attenuating cavity and the second sound attenuating cavity, and a base wall is coupled to each of the plurality of walls opposite the facesheet. The sound attenuating panel includes a perforated backsheet coupled to a portion of the second end of the first sound attenuating cavity and an end of the second sound attenuating cavity to extend along an axis that is transverse to a longitudinal axis of the at least one sound attenuating cell to define a chamber between the backsheet and the base wall.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
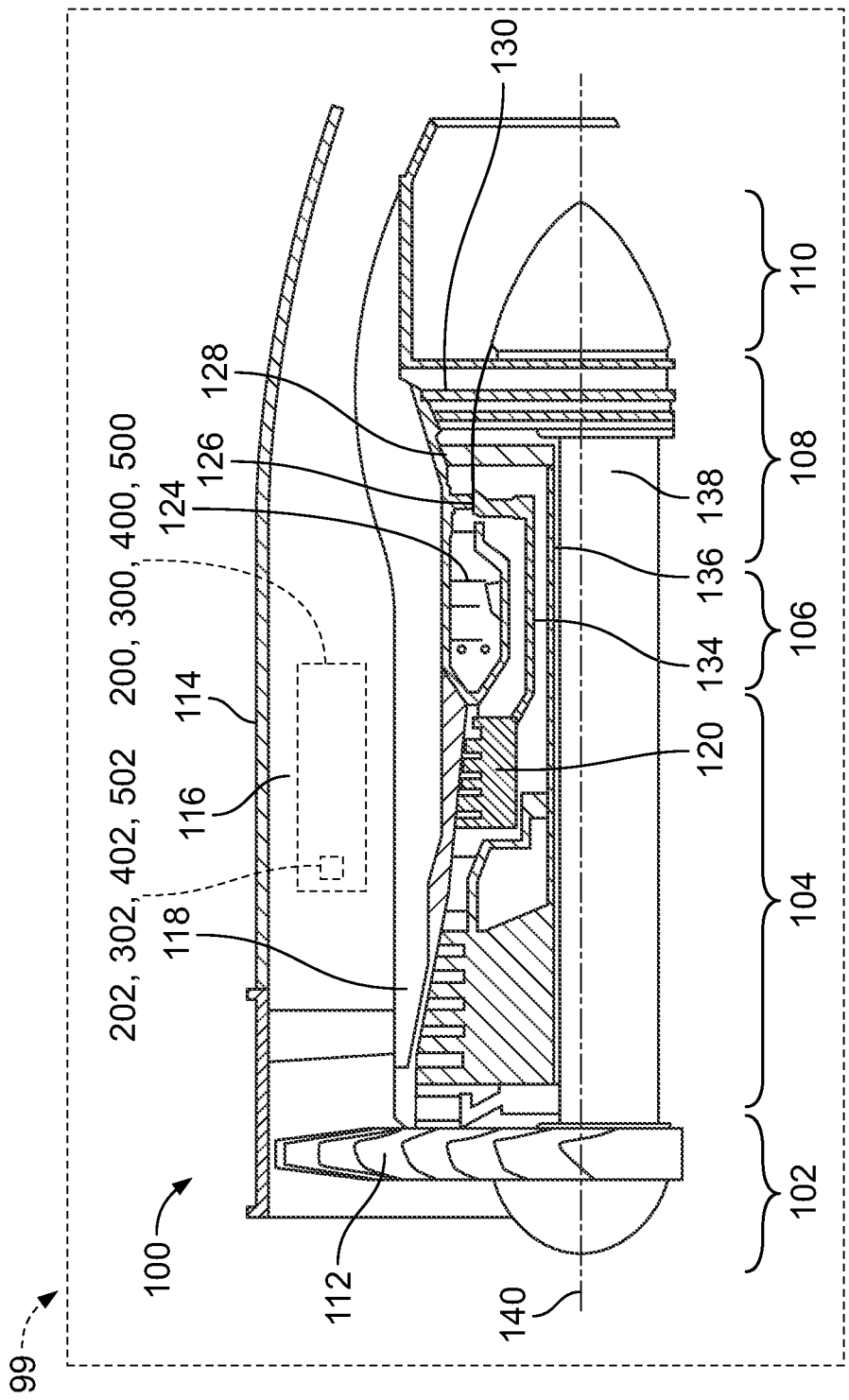
FIG. 1 is a schematic cross-sectional illustration of a gas turbine engine, which includes an exemplary system for sound attenuation, which includes a sound attenuation panel and at least one sound attenuation cell in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from sound attenuation and the use of the system for sound attenuation in a gas turbine engine described herein is merely one exemplary embodiment according to the present disclosure. In addition, while the system for sound attenuation is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

With reference to FIG. 1, a partial, cross-sectional view of an exemplary gas turbine engine 100 is shown with the remaining portion of the gas turbine engine 100 being axisymmetric about a longitudinal axis 140, which also comprises an axis of rotation for the gas turbine engine 100. In the depicted embodiment, the gas turbine engine 100 is an annular multi-spool turbofan gas turbine jet engine. As will be discussed herein, the gas turbine engine 100 includes a system for sound attenuation or a sound attenuation panel 200 that includes at least one sound attenuation cell 202, which provides attenuation over a broad range of frequencies, such as a broad frequency range of about 500 hertz (Hz) to about 6,500 hertz (Hz). By providing attenuation over the broad range of frequencies, the sound attenuation panel 200 enables the reduction in sound over the broad range of frequencies without requiring separate systems for separate frequency bands. This reduces cost and complexity of the sound attenuation panel 200. It should be noted that while the sound attenuation panel 200 is illustrated and described herein as being used with the gas turbine engine 100, the sound attenuation panel 200 can be employed with various types of engines, including, but not limited to, gas turbine engines included with auxiliary power units, turbofan, turboprop, turboshaft, and turbojet engines, whether deployed onboard an aircraft, watercraft, or ground vehicle (e.g., a tank), included within industrial power generators, or utilized within another platform or application. In this example, the gas turbine engine 100 is employed within an aircraft 99.

In this example, with reference back to FIG. 1, the gas turbine engine 100 includes a fan section 102, the compressor section 104, a combustor section 106, the turbine section 108, and an exhaust section 110. The fan section 102 includes a fan 112 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined between the inner bypass duct 118 and an outer casing 144. In this example, the sound attenuation panel 200 is coupled to the outer bypass duct 116 to attenuate sound over the broad range of frequencies in the outer bypass duct 116, however, the sound attenuation panel 200 may be employed throughout the gas turbine engine 100, including, but not limited to, an inlet duct associated with the fan section 102, access panels located within the outer bypass duct 116, and a center body located within the exhaust section 110. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
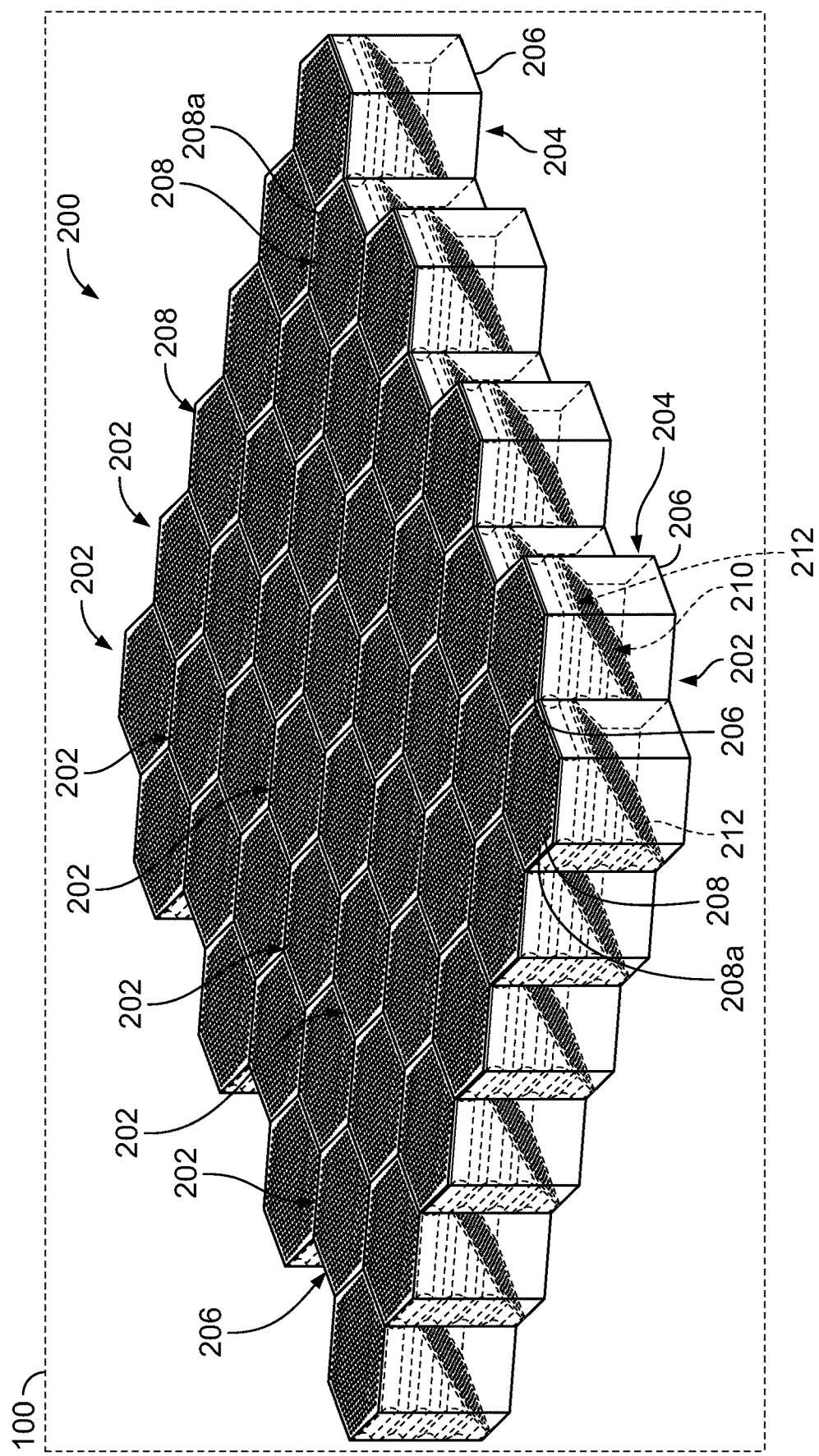
FIG. 2 is a perspective view of the sound attenuation panel of FIG. 1 in accordance with various embodiments.

With reference to FIG. 2, a perspective view of the sound attenuation panel 200 is shown. As discussed, the sound attenuation panel 200 in this example is used in the gas turbine engine 100 to attenuate sound over the broad frequency range. The sound attenuation panel 200 includes a plurality of the sound attenuation cells 202. It should be noted that the arrangement of the sound attenuation cells 202 to form the sound attenuation panel 200 shown in FIG. 2 is merely an example, as the sound attenuation cells 202 may be arranged in any configuration to form the sound attenuation panel 200. In this regard, the sound attenuation cells 202 may be arranged to form any desired polygonal shape for the sound attenuation panel 200, including, but not limited to, rectangular, square, triangular, trapezoid, etc. Moreover, the sound attenuation cells 202 may be arranged to form the sound attenuation panel 200 that has a shape configured for the particular use of the sound attenuation panel 200 within the gas turbine engine 100 such that the sound attenuation panel 200 may have a non-uniform or custom shape to fit the space available in the gas turbine engine 100. In this example, the sound attenuation panel 200 is composed of 48 sound attenuation cells 202, however, it should be understood that the sound attenuation panel 200 may comprise any number of sound attenuation cells 202, including a single sound attenuation cell 202.

In one example, the sound attenuation cells 202 are each additively manufactured to form the sound attenuation panel 200. In this example, each of the sound attenuation cells 202 is composed of a metal or metal alloy, such as aluminum, titanium, Inconel® produced by American Special Metals Corporation of Miami, Fla., United States of America, or high strength plastics, including, but not limited to polyether ether ketone (PEEK) or polyetherimide; and is formed using additive manufacturing, including, but not limited to, direct metal laser sintering (DMLS) or fused deposition modeling (FDM). During the additive manufacture of the sound attenuation cells 202, the sound attenuation panel 200 may be formed by additively manufacturing adjacent ones of the sound attenuation cells 202 together such that the sound attenuation panel 200 is composed of one or more integrally formed sound attenuation cells 202. In other examples, the sound attenuation panel 200 may be formed by coupling discrete sound attenuation cells 202 together via welding, mechanical fasteners, brazing, etc.

Figure 3:
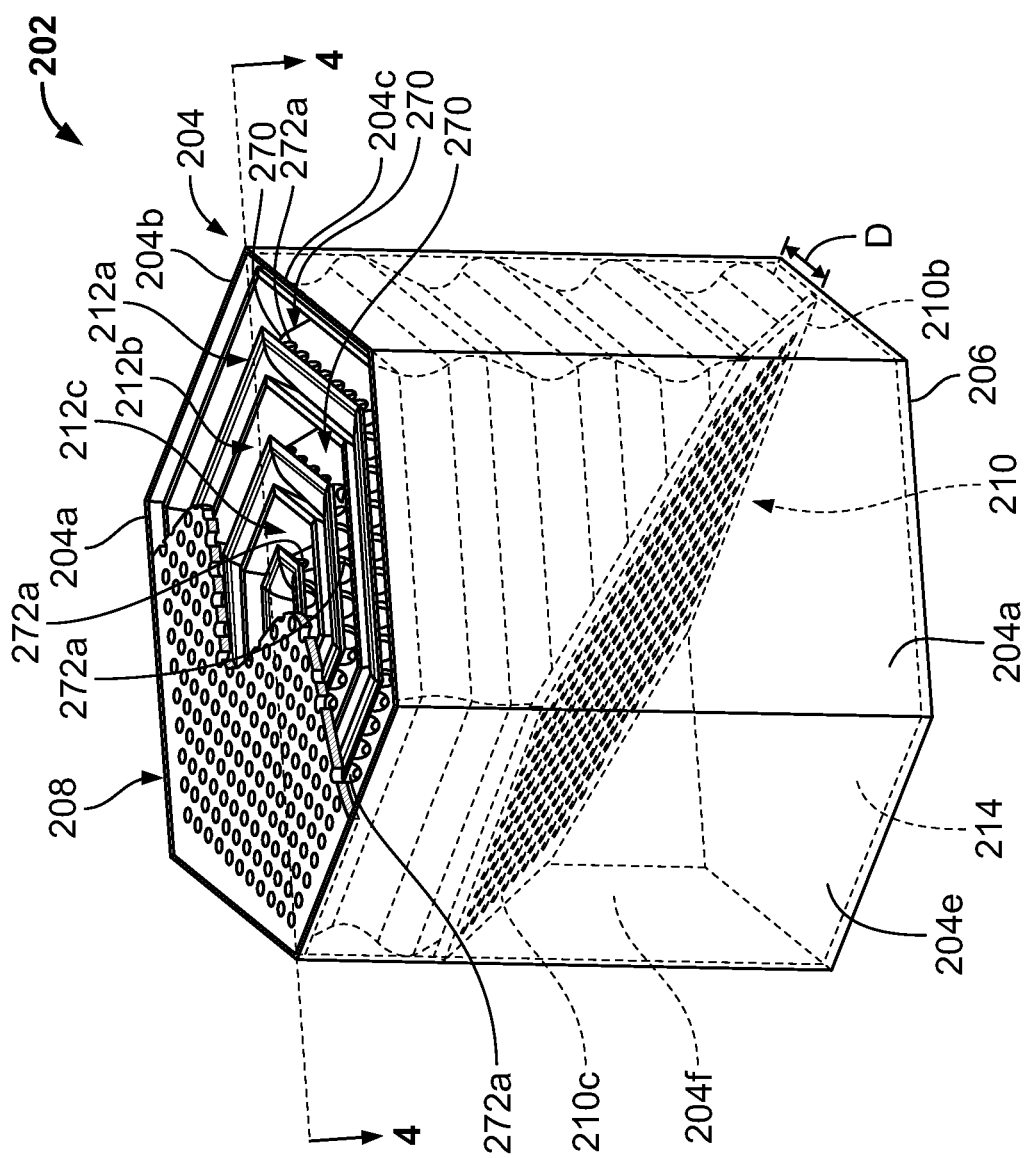
FIG. 3 is a perspective view of one sound attenuation cell of the sound attenuation panel of FIG. 2.

With reference to FIG. 3, one of the sound attenuation cells 202 is shown. As each of the sound attenuation cells 202 is the same, a single one of the sound attenuation cells 202 will be discussed in detail herein. In this example, each of the sound attenuation cells 202 includes a plurality of walls 204, a base wall 206, a facesheet 208, a backsheet 210 and at least one or a plurality of sound attenuating cavities 212. As discussed, generally, each of the sound attenuation cells 202 is integrally or monolithically formed so as to be one-piece via additive manufacturing.

The plurality of walls 204 cooperate to surround the plurality of sound attenuating cavities 212. In one example, the plurality of walls 204 include six planar walls 204a-204f, which cooperate to define a hexagon. It should be noted that in other examples, the plurality of walls 204 may cooperate to define any suitable polygonal shape, including, but not limited to, cylindrical, rectangular, square, trapezoid, pentagon, etc. The walls 204a-204f are solid or non-perforated. The walls 204a-204f each extend from the facesheet 208 to the base wall 206. In one example, the walls 204a-204f are each coupled to or integrally formed with the facesheet 208, the base wall 206 and the plurality of sound attenuating cavities 212.

The base wall 206 forms a second or bottom side of the sound attenuation cell 202, while the facesheet 208 forms a first or top side of the sound attenuation cell 202. The base wall 206 is hexagonal, and is coupled to or integrally formed with each of the walls 204a-204f so as to be opposite the facesheet 208. The base wall 206 is also coupled to or integrally formed with a portion of the plurality of sound attenuating cavities 212 and the backsheet 210. The base wall 206 is planar and is solid or non-perforated. In this example, each of the sound attenuation cells 202 has the base wall 206, however, in other embodiments, the sound attenuation panel 200 may be formed such that a single base wall 206 extends over a plurality of the sound attenuation cells 202. As will be discussed, in this example, the base wall 206 of each of the sound attenuation cells 202 cooperates with the backsheet 210 of each of the sound attenuation cells 202 to define a chamber 214 in each of the sound attenuation cells 202. The base wall 206 extends parallel to the facesheet 208.

With reference to FIG. 2, the facesheet 208 is coupled to or integrally formed with each of the walls 204a-204f to enclose the sound attenuation cell 202. The facesheet 208 is also coupled to or integrally formed with the plurality of sound attenuating cavities 212. The facesheet 208 is planar, and is perforated with a plurality of perforations or openings 208a that enable fluid, such as air, to enter into the plurality of sound attenuating cavities 212 of the sound attenuation cell 202. The facesheet 208 may include any predetermined number of openings 208a to fluidly couple the plurality of sound attenuating cavities 212 to the surrounding fluid. In this example, each of the sound attenuation cells 202 has the facesheet 208, however, in other embodiments, the sound attenuation panel 200 may be formed such that a single facesheet 208 extends over a plurality of the sound attenuation cells 202. The facesheet 208 defines both the inlet and the outlet for the sound attenuation cells 202. In this regard, as the base wall 206 is solid or non-perforated, the base wall 206 does not define an outlet. Rather, fluid, such as air, enters the sound attenuation cells 202 via the facesheet 208, and exits the sound attenuation cells 202 via the facesheet 208.

Figure 4:
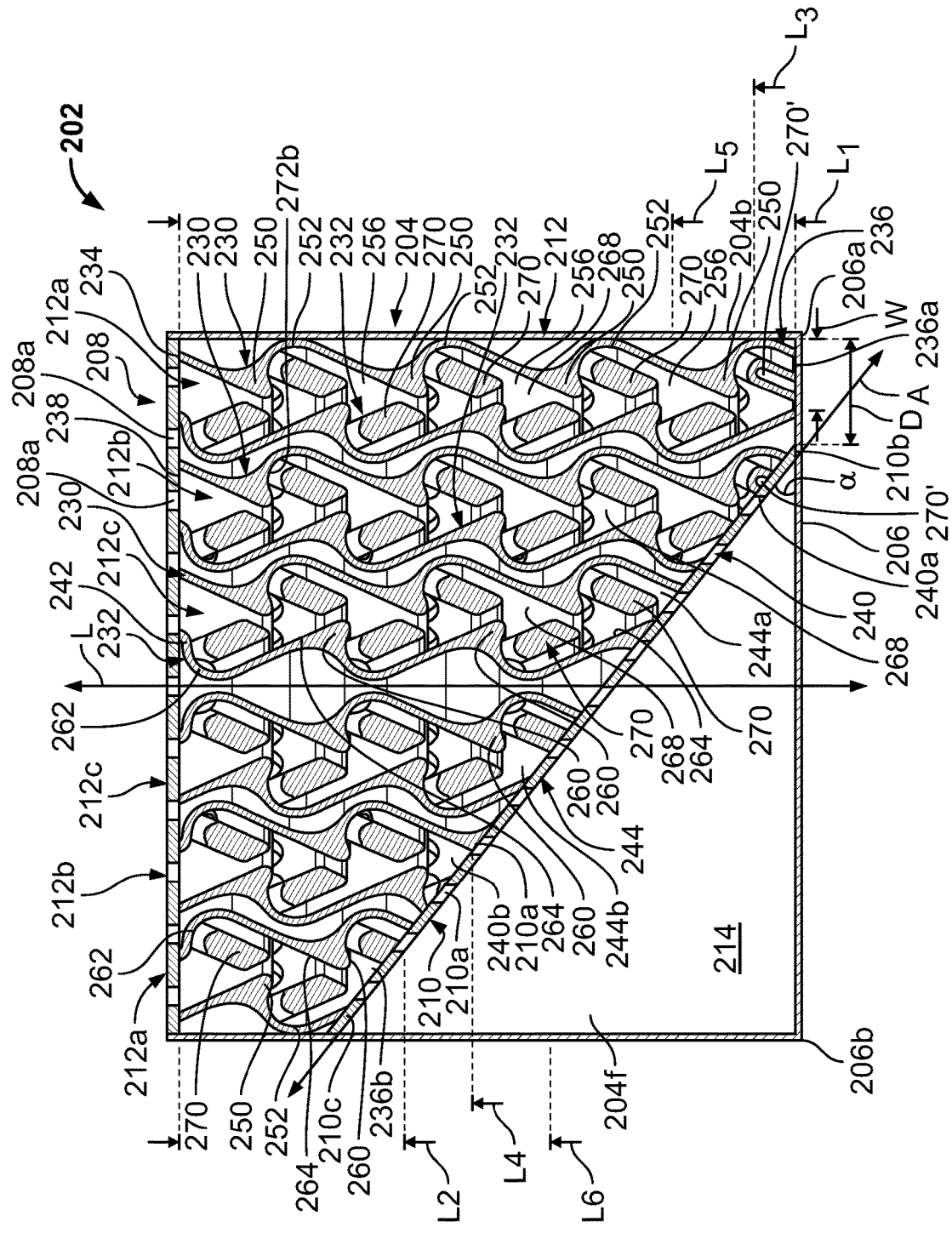
FIG. 4 is a cross-sectional view of the sound attenuation cell of FIG. 3, taken along line 4-4 of FIG. 3.

With reference to FIG. 4, the backsheet 210 is coupled to or integrally formed with a portion of the plurality of sound attenuating cavities 212 at an end of the portion of the plurality of sound attenuating cavities 212 opposite the facesheet 208. The backsheet 210 is also coupled to or integrally formed with the base wall 206 and walls 204a and 204c-f (FIG. 3). The backsheet 210 is perforated with a plurality of perforations or openings 210a that enable fluid, such as air, to enter into the chamber 214 of the sound attenuation cell 202. The backsheet 210 may include any predetermined number of openings 210a to fluidly couple the plurality of sound attenuating cavities 212 to the chamber 214. In this example, the backsheet 210 extends along an axis A, which is transverse or oblique to a longitudinal axis L of the sound attenuation cell 202. The facesheet 208 and the base wall 206 are each orientated to extend along an axis that is substantially perpendicular to the longitudinal axis L. The backsheet 210 is generally formed to extend along the axis A, which is also transverse to an axis along which the facesheet 208 and an axis along which the base wall 206 extends. In other words, the backsheet 210 extends at an angle α defined between the backsheet 210 and the base wall 206. The angle α is about 40 to about 50 degrees, and in one example, is about 45 degrees. By forming the backsheet 210 at the angle α and to extend transverse to the longitudinal axis L, the chamber 214 has a volume that varies along the sound attenuation cell 202, which enables for attenuation of different frequency ranges by the sound attenuation cell 202. The chamber 214 is defined as an empty space or void between the backsheet 210 and the base wall 206. Since the chamber 214 does not contain any material and is an empty space or void, the chamber 214 provides a weight savings to each sound attenuation cell 202. This weight savings benefit is multiplied by the number of sound attenuation cells 202 within the sound attenuation panel 200, which may significantly reduce the weight associated with the sound attenuation panel 200. In this example, the chamber 214 is pyramidal in shape, however, the chamber 214 may have any shape depending upon the orientation of the backsheet 210 to the base wall 206. The volume of the chamber 214 increases from a first end 210b of the backsheet 210 to a second end 210c of the backsheet 210. The first end 210b of the backsheet 210 is coupled to or integrally formed with the base wall 206, and the second end 210c of the backsheet 210 is coupled to or integrally formed with the wall 204e (FIG. 3).

Figure 5:
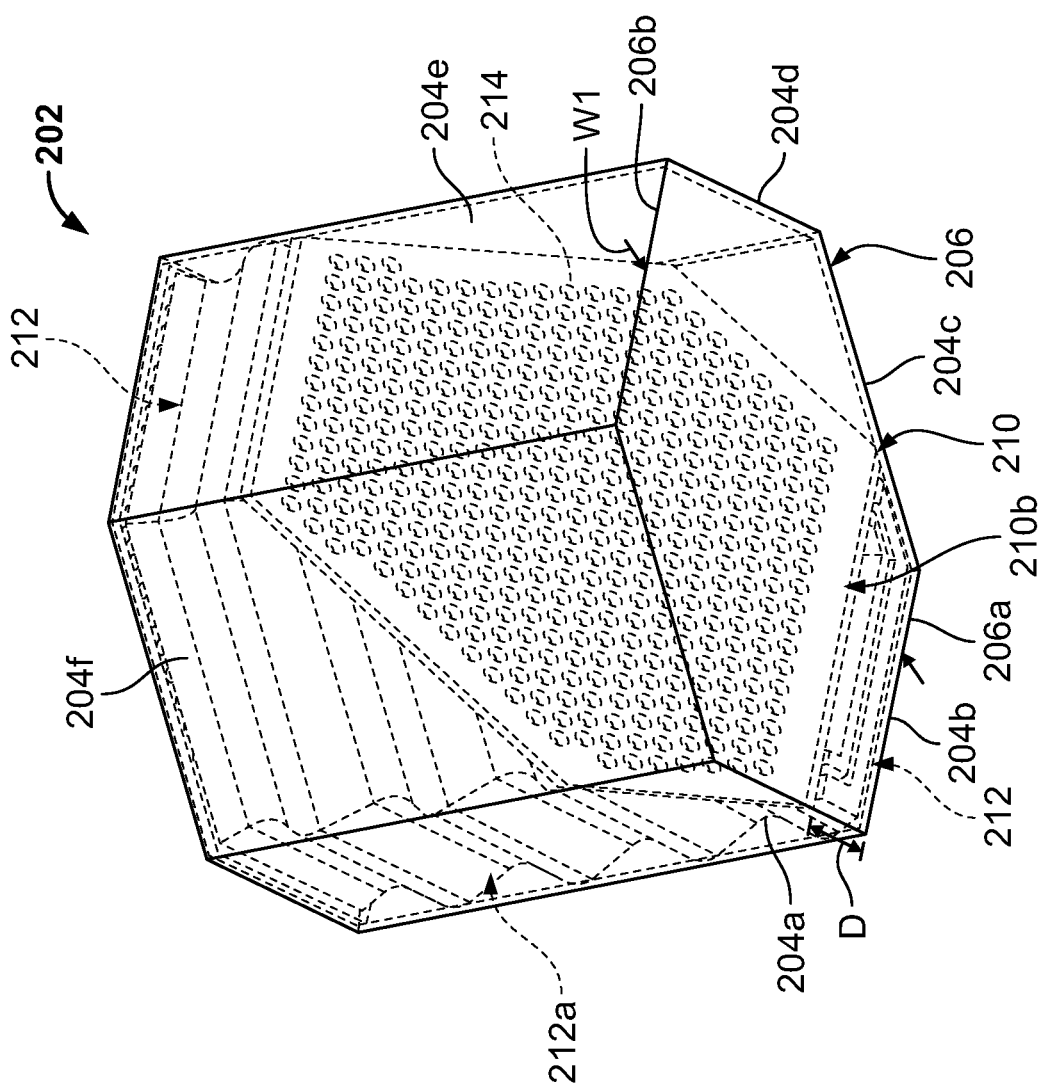
FIG. 5 is a bottom view of the sound attenuation cell of FIG. 3.

In this example, with reference to FIG. 5, the backsheet 210 is defined a distance D from a first side 206a of the base wall 206. The first side 206a of the base wall 206 is opposite a second side 206b of the base wall 206. The first side 206a is coupled to or integrally formed with the wall 204b, and the second side 206b is coupled to or integrally formed with the wall 204e. Generally, the distance D is slightly greater than a width W of the sound attenuation chamber 212a (FIG. 4), or is about 5% to about 10% of the overall width W1 of the base wall 206. This enables at least a portion of the sound attenuating cavities 212 to completely extend from the facesheet 208 to the base wall 206 (length L1, FIG. 4) to realize the full height of the sound attenuation cell 202. This provides sound attenuation at the lowest frequencies for this particular location of the sound attenuating cavities 212, whereas the locations of the shorter portions of the sound attenuating cavities 212 (lengths L2-L6, FIG. 4) provide sound attenuation for the higher frequencies. The constant change in lengths L1-L6 (FIG. 4) in the sound attenuation cavities 212 provides the broadband sound attenuation in the sound attenuation cell 202. Thus, the backsheet 210 is positioned the distance D from the first side 206a of the base wall 206 to enable a portion of one of the plurality of sound attenuating cavities 212 to attenuate sound at a different frequency than a remainder of the plurality of sound attenuating cavities 212. As discussed, the distance D is predetermined such that the portion of one of the plurality of sound attenuating cavities 212 terminates at the base wall 206, while a remainder of the plurality of sound attenuating cavities 212 terminate at the backsheet 210. The varying of the lengths L1-L6 (FIG. 4) of the plurality of sound attenuating cavities 212 and the termination locations enables the sound attenuation cell 202 to attenuate the broad range of frequencies.

With reference to FIG. 4, the plurality of sound attenuating cavities 212 extend about the longitudinal axis L. In this example, the sound attenuation cells 202 each include three of the plurality of sound attenuating cavities 212: a first sound attenuating cavity 212a, a second sound attenuating cavity 212b and a third sound attenuating cavity 212c. The second sound attenuating cavity 212b and the third sound attenuating cavity 212c are nested within an inner perimeter of the first sound attenuating cavity 212a. The third sound attenuating cavity 212c is nested within an inner perimeter of the second sound attenuating cavity 212b. Each of the sound attenuating cavities 212a-212c is concentric about the longitudinal axis L. Each of the sound attenuating cavities 212a-212c includes a first sidewall 230 opposite a second sidewall 232. The second sidewall 232 is radially inward from the first sidewall 230 such that the first sidewall 230 defines a perimeter of the respective sound attenuating cavity 212a-212c. The first sound attenuating cavity 212a extends from a first end 234 coupled to or integrally formed with the facesheet 208 to a second end 236. A portion 236a of the second end 236 proximate the wall 204b terminates at the base wall 206, while a portion 236b of the second end 236 terminates at the backsheet 210. Stated another way, the orientation of the backsheet 210 results in the first sound attenuating cavity 212a having a first length L1 proximate the first side 206a of the base wall 206, and a second length L2 proximate the second side 206b of the base wall 206. Thus, the length of the first sound attenuating cavity 212a varies about the perimeter of the sound attenuation cell 202 (FIG. 3). In one example, the length of the first sound attenuating cavity 212a is reduced by about 75% between the first length L1 and the second length L2.

The second sound attenuating cavity 212b extends from a third end 238 coupled to or integrally formed with the facesheet 208 to a fourth end 240. A portion 240a of the fourth end 240 proximate the wall 204b terminates at the backsheet 210 proximate the first end 210b of the backsheet 210, and a portion 240b of the fourth end 240 terminates proximate the second end 210c of the backsheet 210. The orientation of the backsheet 210 results in the second sound attenuating cavity 212b having a third length L3 proximate the first side 206a of the base wall 206, and a fourth length L4 proximate the second side 206b of the base wall 206. Thus, the length of the second sound attenuating cavity 212b varies about the perimeter of the sound attenuation cell 202 (FIG. 3). In one example, the length of the second sound attenuating cavity 212b is reduced by about 50% between the third length L3 and the fourth length L4.

The third sound attenuating cavity 212c extends from a fifth end 242 coupled to or integrally formed with the facesheet 208 to a sixth end 244. A portion 244a of the sixth end 244 proximate the wall 204b terminates at the backsheet 210 proximate the first end 210b of the backsheet 210, and a portion 244b of the sixth end 244 terminates proximate the second end 210c of the backsheet 210. The orientation of the backsheet 210 results in the third sound attenuating cavity 212c having a fifth length L5 proximate the first side 206a of the base wall 206, and a sixth length L6 proximate the second side 206b of the base wall 206. Thus, the length of the third sound attenuating cavity 212c varies about the perimeter of the sound attenuation cell 202 (FIG. 3). In one example, the length of the third sound attenuating cavity 212c is reduced by about 10% between the fifth length L5 and the sixth length L6. In this example, each of the lengths L1-L6 is different.

As discussed, each of the sound attenuating cavities 212a-212c is defined by extruding the first sidewall 230 and the second sidewall 232 about the longitudinal axis L. In this example, each of the sound attenuating cavities 212a-212c include the same first sidewall 230 and the same second sidewall 232, but the lengths of the first sidewall 230 and the second sidewall 232 are varied due to the orientation of the backsheet 210 along the axis A. Each of the first sidewalls 230 includes a plurality of first undulations 250, with each first undulation 250 separated by a respective first valley 252 of a plurality of first valleys 252. A first sloped surface 254 of a plurality of first sloped surfaces 254 is defined to interconnect a respective adjacent first valley 252 with an adjacent first undulation 250. The first undulation 250, the first valley 252 and the first sloped surface 254 alternate or repeat along the first sidewall 230 from the respective end 234, 238, 242 to the respective end 236, 240, 244 to form a first undulating surface. Generally, from the respective end 234, 238, 242, the first sidewall 230 includes one of the first sloped surfaces 254 coupled to or integrally formed with the facesheet 208, transitions to one of the first undulations 250 and then to one of the first valleys 252. This repeats until the first sidewall 230 terminates at the respective end 236, 240, 244.

Each of the second sidewalls 232 includes a plurality of second undulations 260, with each second undulation 260 separated by a respective second valley 262 of a plurality of second valleys 262. A second sloped surface 264 of a plurality of second sloped surfaces 264 is defined to interconnect a respective adjacent second valley 262 with an adjacent second undulation 260. The second undulation 260, the second valley 262 and the second sloped surface 264 alternate or repeat along the second sidewall 232 from the respective end 234, 238, 242 to the respective end 236, 240, 244 to form a second undulating surface. Generally, from the respective end 234, 238, 242, the second sidewall 232 includes one of the second valleys 262 coupled to or integrally formed with the facesheet 208, transitions to one of the second sloped surfaces 264 and then to one of the second undulations 260. This repeats until the second sidewall 232 terminates at the respective end 236, 240, 244.

Figure 4A:
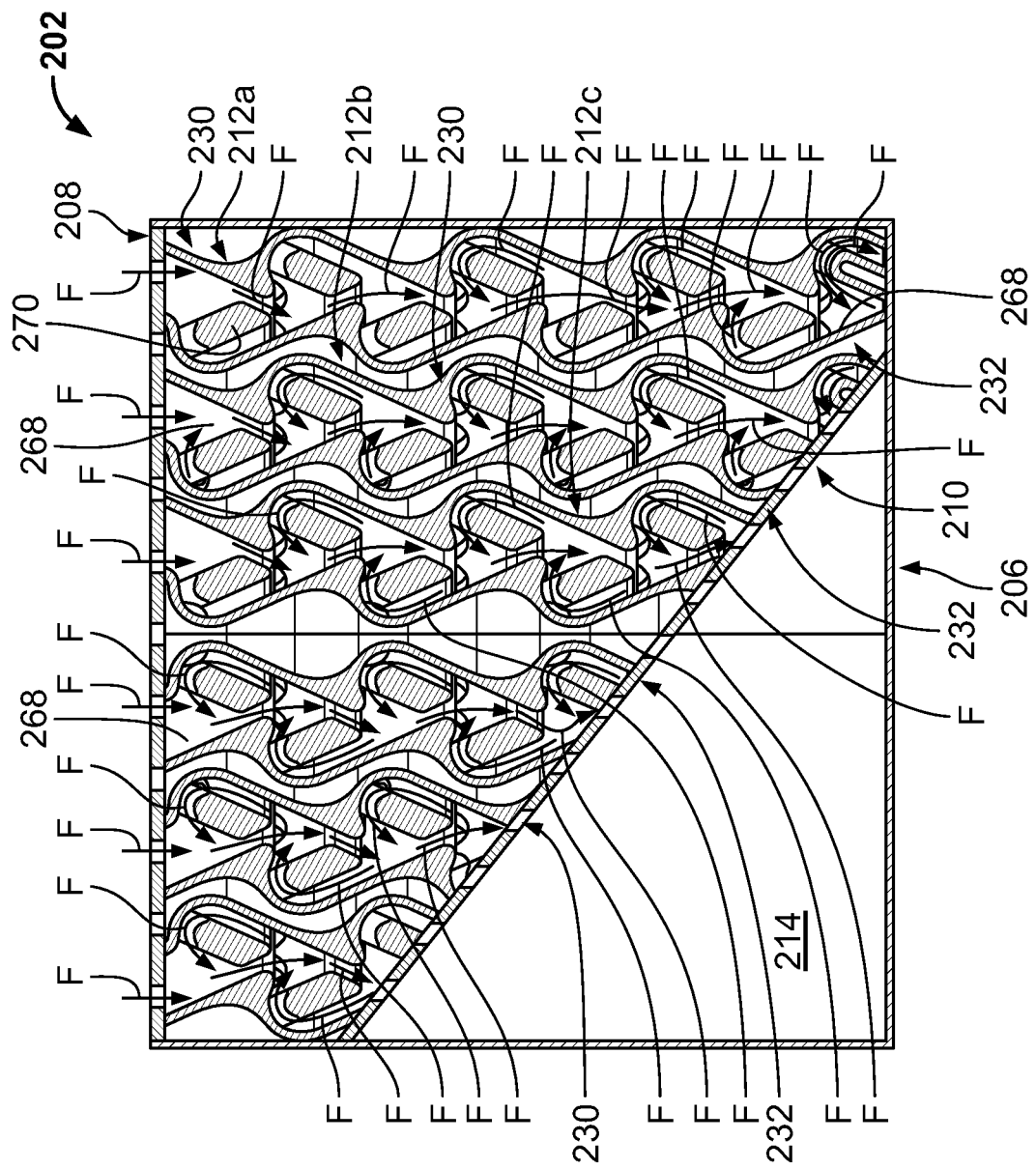
FIG. 4A is a cross-sectional view of the sound attenuation cell of FIG. 3, taken along line 4-4 of FIG. 3, which illustrates a flow of a fluid within the sound attenuation cell.

Thus, generally, the first sidewall 230 is out of phase with or is axially misaligned with the second sidewall 232 such that the plurality of first undulations 250 are axially misaligned with or offset from the plurality of second undulations 260. The misalignment between the undulations 250, 260 defines a tortuous path 268 between the first sidewall 230 and the second sidewall 232. The tortuous path 268 causes the sound waves carried by the fluid F to continually be reflected into and between the first sidewall 230 and the second sidewall 232. This causes friction losses and vibration, which dampen the sound by converting the sound energy into heat. In one example, with reference to FIG. 4A, the sound attenuation cell 202 is shown with a movement of the fluid F shown schematically within the cross-section of the sound attenuation cell 202. As shown, the fluid F enters into the sound attenuating cavity 212 from the facesheet 208 and flows down each of the sound attenuating cavities 212a-212c. The fluid F is continually reflected into the first sidewall 230 and the second sidewall 232 due to deflectors 270, the first undulating surface of the first sidewall 230 and the second undulating surface of the second sidewall 232. The shape of the first sidewall 230 and the second sidewall 232 along with the deflectors 270 that define the tortuous path 268 causes the fluid F to be continuously reflected onto itself, which dampens the sound carried by the fluid F. Generally, the fluid F is deflected in various ways as it travels down the sound attenuating cavities 212a-212c from the facesheet 208. Once the fluid F enters the chamber 214, it may not enter perpendicular to the base wall 206. Once inside the chamber 214, the fluid F continues to reflect off the various walls 204a, 204c-204f and base wall 206 that define the chamber 214 and exits through any one of the perforations 210a associated with the backsheet 210. This results in the fluid F traveling down the sound attenuation cavity 212a-212c, reflecting inside the chamber 214, and exiting the chamber 214 via any combination of different sound attenuation cavities 212a-212c.

Figure 6:
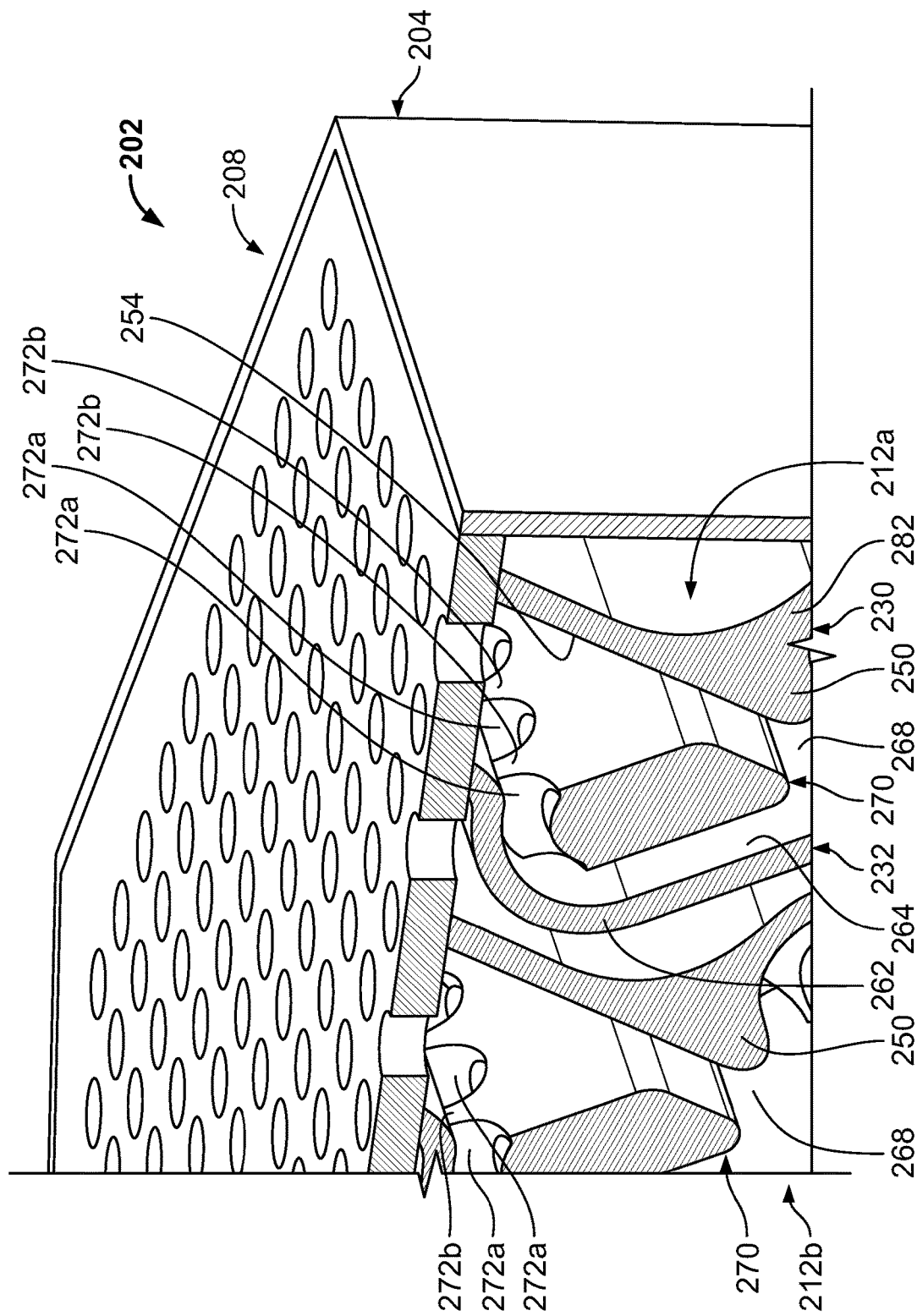
FIG. 6 is a detail view of a portion of a sound attenuating cavity of the sound attenuation cell of FIG. 3.

In one example, each of the valleys 252, 262 includes a deflector 270 coupled to or integrally formed with the respective valley 252, 262 that extends about a perimeter of the respective one of the sound attenuating cavities 212a-212c. With reference to FIG. 6, a portion of the deflectors 270 is shown in greater detail. Each of the deflectors 270 is coupled to or integrally formed with the respective one of the valleys 252, 262 to be cantilevered from a surface of the respective valley 252, 262. In this regard, each of the deflectors 270 includes a first deflector end 272 opposite a second deflector end 274. The first deflector end 272 is coupled to or integrally formed with the respective one of the valleys 252, 262, and the second deflector end 274 extends outwardly from the respective valley 252, 262 into the tortuous path 268 defined between the first sidewall 230 and the second sidewall 232. Stated another way, the deflectors 270 coupled to or integrally formed with the first valleys 252 extend outwardly toward the second undulating surface of the second sidewall 232, while the deflectors 270 coupled to or integrally formed with the second valleys 262 extend outwardly toward the first undulating surface of the first sidewall 230. In this example, the first deflector end 272 includes a plurality of deflector openings 272a that are spaced apart about a periphery of the first deflector end 272. The plurality of deflector openings 272a are substantially evenly spaced apart about the periphery of the first deflector end 272 and result in bridges 272b that couple the first deflector end 272 to the valley 252, 262. The plurality of deflector openings 272a also enable material, such as the metal or metal alloy used to form the sound attenuation cells 202, to exit the sound attenuation cells 202 during the formation of the sound attenuating cavities 212a-212c. In addition, the deflector openings 272a also enable sound carried by the fluid F to pass through the deflector openings 272a, which assists in the attenuation of the sound. The deflectors 270 also provide support during the additive manufacture of the sound attenuating cell 202. It should be noted that while the deflectors 270 are illustrated herein as being solid, in certain examples, as shown in FIG. 4, the first sidewall 230 may terminate at the respective end 236, 240, 244 with a hollow deflector 270'. The hollow deflector 270' may provide a weight savings. In other examples, the first sidewall 230 may terminate at the respective end 236, 240, 244 with the solid deflector 270.

Figure 7:
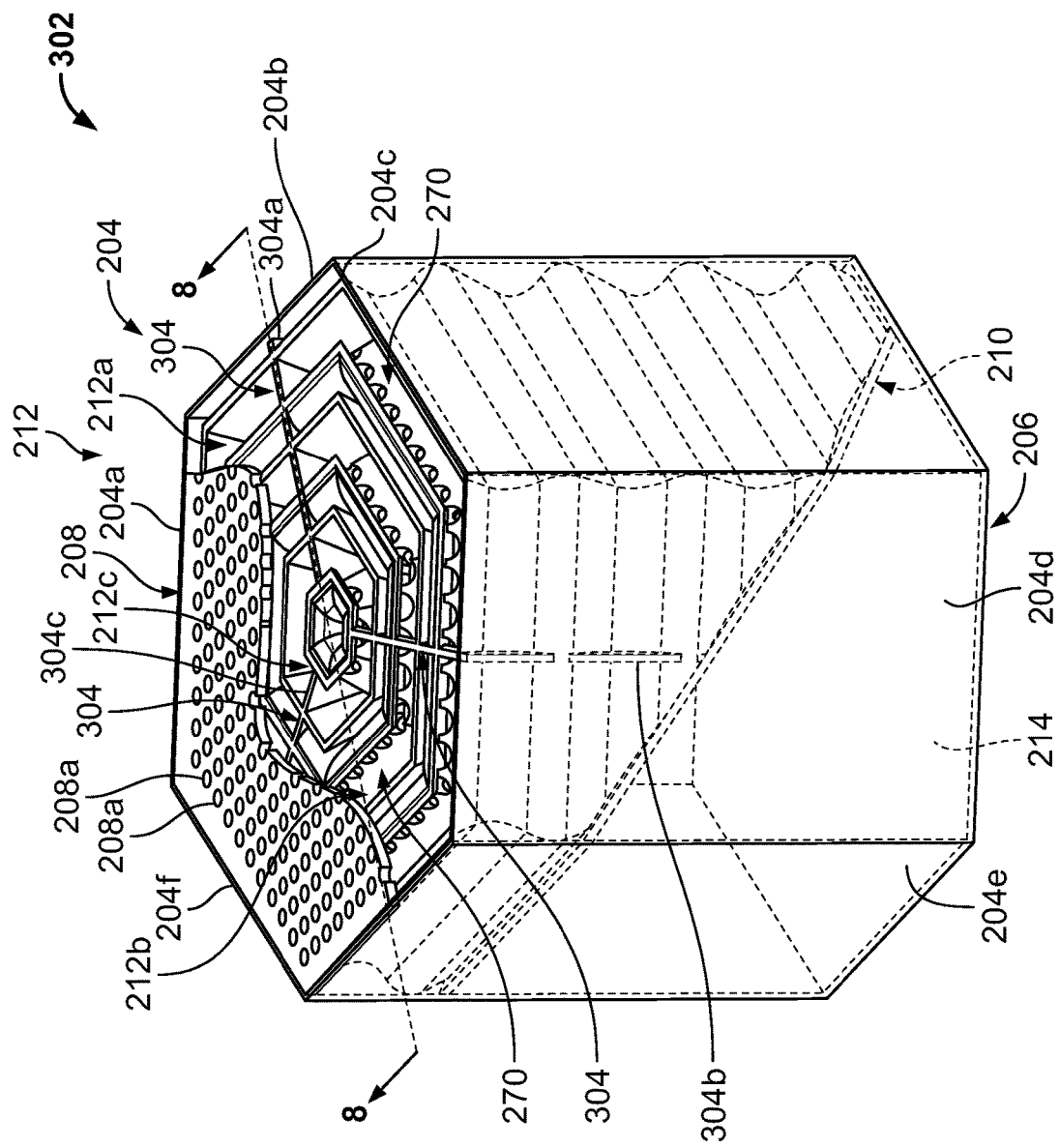
FIG. 7 is a perspective view of another exemplary sound attenuation cell for a sound attenuation panel for use with the gas turbine engine of FIG. 1 in accordance with various embodiments.

It should be noted that in other embodiments, the sound attenuation cells 202 may be configured differently to attenuate sound over the broad range of frequencies. For example, with reference to FIG. 7, a sound attenuation cell 302 is shown. As the sound attenuation cell 302 includes components that are the same or similar to components of the sound attenuation cell 202 discussed with regard to FIGS. 1-6, the same reference numerals will be used to denote the same or similar components. Further, while only one of the sound attenuation cell 302 is shown herein, it should be understood that one or more of the sound attenuation cells 302 may be coupled together or integrally formed into a sound attenuation panel 300 (FIG. 1), similar to the sound attenuation panel 200 discussed with regard to FIGS. 1-6. In this example, the sound attenuation cell 302 includes the plurality of walls 204, the base wall 206, the facesheet 208, the backsheet 210, at least one or the plurality of sound attenuating cavities 212 and at least one or a plurality of partitions 304. The sound attenuation cells 302 is integrally or monolithically formed to be one-piece from a metal or metal alloy, including, but not limited to aluminum, titanium, Inconel® produced by American Special Metals Corporation of Miami, Fla., United States of America, or high strength plastics including, but not limited to polyether ether ketone (PEEK) or polyetherimide; and is formed using additive manufacturing, including, but not limited to, direct metal laser sintering (DMLS) or fused deposition modeling (FDM).

The plurality of walls 204 cooperate to surround the plurality of sound attenuating cavities 212 and the plurality of partitions 304. In one example, the plurality of walls 204 include the six planar walls 204a-204f, which cooperate to define the hexagon. It should be noted that in other examples, the plurality of walls 204 may cooperate to define any suitable polygonal shape, including, but not limited to, cylindrical, rectangular, square, trapezoid, pentagon, etc. The walls 204a-204f are each coupled to or integrally formed with the facesheet 208, the base wall 206, the plurality of sound attenuating cavities 212 and the plurality of partitions 304. The base wall 206 forms a second or bottom side of the sound attenuation cell 302, while the facesheet 208 forms a first or top side of the sound attenuation cell 302. The base wall 206 is hexagonal, and is coupled to or integrally formed with each of the walls 204a-204f so as to be opposite the facesheet 208. The base wall 206 is also coupled to or integrally formed with a portion of the plurality of sound attenuating cavities 212, the backsheet 210 and the plurality of partitions 304. The base wall 206 is planar and is solid or non-perforated. The base wall 206 of the sound attenuation cell 302 cooperates with the backsheet 210 to define the chamber 214 in the sound attenuation cell 302.

The facesheet 208 is coupled to or integrally formed with each of the walls 204a-204f and the plurality of partitions 304. The facesheet 208 is also coupled to or integrally formed with the plurality of sound attenuating cavities 212. While the facesheet 208 is shown partially broken away in FIG. 7, it will be understood that the facesheet 208 extends over the entirety of the sound attenuation cell 302 to enclose the sound attenuation cell 302 and is coupled to each of the walls 204a-204f as shown in FIG. 2. The facesheet 208 is planar, and is perforated with the plurality of perforations or openings 208a that enable fluid, such as air, to enter into the plurality of sound attenuating cavities 212 of the sound attenuation cell 202. The facesheet 208 defines both the inlet and the outlet for the sound attenuation cell 302.

The backsheet 210 is coupled to or integrally formed with a portion of the plurality of sound attenuating cavities 212 and the plurality of partitions 304 opposite the facesheet 208. The backsheet 210 is also coupled to or integrally formed with the base wall 206 and walls 204a and 204c-f. The backsheet 210 is perforated with the plurality of perforations or openings 210a that enable fluid, such as air, to enter into the chamber 214 of the sound attenuation cell 302. In this example, with reference to FIG. 8, the backsheet 210 extends along the axis A, which is transverse or oblique to a longitudinal axis L10 of the sound attenuation cell 302. The facesheet 208 and the base wall 206 are each orientated to extend along an axis that is substantially perpendicular to the longitudinal axis L10. The backsheet 210 extends at the angle $\alpha$ defined between the backsheet 210 and the base wall 206. The first end 210b of the backsheet 210 is coupled to or integrally formed with the base wall 206, and the second end 210c of the backsheet 210 is coupled to or integrally formed with the wall 204e. In this example, the backsheet 210 is defined the distance D from the first side 206a of the base wall 206. The first side 206a is coupled to or integrally formed with the wall 204b, and the second side 206b is coupled to or integrally formed with the wall 204e.

The plurality of sound attenuating cavities 212 extend about the longitudinal axis L10. In this example, the sound attenuation cell 302 includes the first sound attenuating cavity 212a, the second sound attenuating cavity 212b and the third sound attenuating cavity 212c. The second sound attenuating cavity 212b and the third sound attenuating cavity 212c are nested within the inner perimeter of the first sound attenuating cavity 212a. The third sound attenuating cavity 212c is nested within the inner perimeter of the second sound attenuating cavity 212b. Each of the sound attenuating cavities 212a-212c is concentric about the longitudinal axis L10. Each of the sound attenuating cavities 212a-212c includes the first sidewall 230 opposite the second sidewall 232. The first sound attenuating cavity 212a extends from the first end 234 coupled to or integrally formed with the facesheet 208 to the second end 236. The second sound attenuating cavity 212b extends from the third end 238 coupled to or integrally formed with the facesheet 208 to the fourth end 240. The third sound attenuating cavity 212c extends from the fifth end 242 coupled to or integrally formed with the facesheet 208 to the sixth end 244. As discussed previously, the lengths L1-L6 (FIG. 4) of the sound attenuating cavities 212a-212c vary about the perimeter of the sound attenuation cell 302.

Each of the sound attenuating cavities 212a-212c is defined by extruding the first sidewall 230 and the second sidewall 232 about the longitudinal axis L10. In this example, each of the sound attenuating cavities 212a-212c include the same first sidewall 230 and the same second sidewall 232, but the lengths of the first sidewall 230 and the second sidewall 232 are varied due to the orientation of the backsheet 210 along the axis A. Each of the first sidewalls 230 includes the plurality of first undulations 250, with each first undulation 250 separated by the respective first valley 252 of the plurality of first valleys 252. The first sloped surface 254 of the plurality of first sloped surfaces 254 is defined to interconnect the respective adjacent first valley 252 with the adjacent first undulation 250 to form the first undulating surface.

Each of the second sidewalls 232 includes the plurality of second undulations 260, with each second undulation 260 separated by the respective second valley 262 of the plurality of second valleys 262. The second sloped surface 264 of the plurality of second sloped surfaces 264 is defined to interconnect the respective adjacent second valley 262 with the adjacent second undulation 260 to form the second undulating surface. The first sidewall 230 is out of phase with or is axially misaligned with the second sidewall 232 such that the plurality of first undulations 250 are axially misaligned with or offset from the plurality of second undulations 260. The misalignment between the undulations 250, 260 defines the tortuous path 268 between the first sidewall 230 and the second sidewall 232.

In one example, each of the valleys 252, 262 includes the deflector 270 coupled to or integrally formed with the respective valley 252, 262 that extends about the perimeter of the respective one of the sound attenuating cavities 212a-212c. Each of the deflectors 270 includes the first deflector end 272 opposite the second deflector end 274. The first deflector end 272 is coupled to or integrally formed with the respective one of the valleys 252, 262, and the second deflector end 274 extends outwardly from the respective valley 252, 262 into the tortuous path 268 defined between the first sidewall 230 and the second sidewall 232. Stated another way, the deflectors 270 coupled to or integrally formed with the first valleys 252 extend outwardly toward the second undulating surface of the second sidewall 232, while the deflectors 270 coupled to or integrally formed with the second valleys 262 extend outwardly toward the first undulating surface of the first sidewall 230. In this example, the first deflector end 272 includes the plurality of deflector openings 272a that are spaced apart about the periphery of the first deflector end 272. The bridges 272b couple the first deflector end 272 to the valley 252, 262. It should be noted that while the deflectors 270 are illustrated herein as being solid, in certain examples, the first sidewall 230 may terminate at the respective end 236, 240, 244 with a hollow deflector 270'. The hollow deflector 270' may provide a weight savings. In other examples, the first sidewall 230 may terminate at the respective end 236, 240, 244 with the solid deflector 270.

Figure 8:
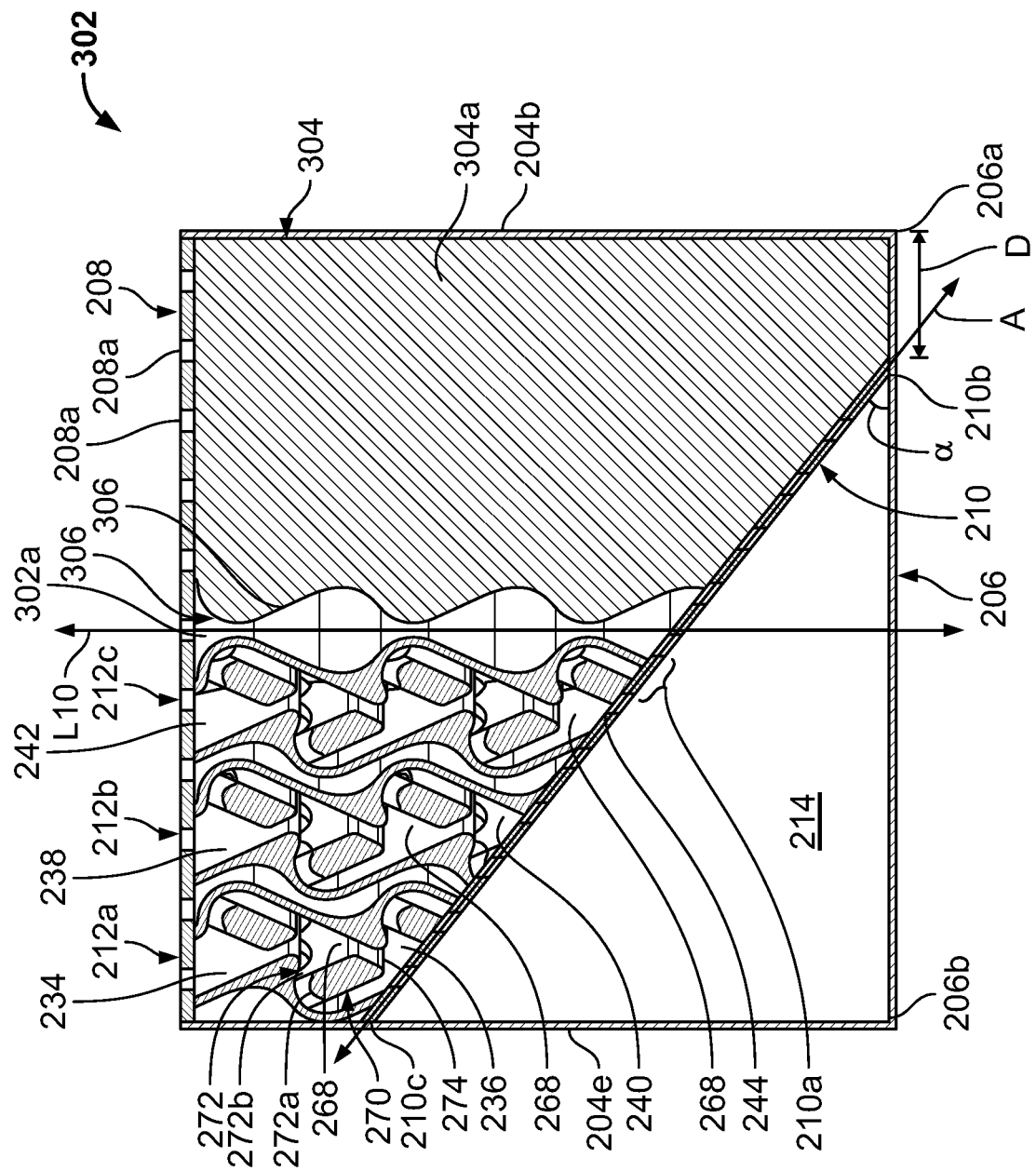
FIG. 8 is a cross-sectional view of the sound attenuation cell of FIG. 7, taken along line 8-8 of FIG. 7.

With reference back to FIG. 7, the plurality of partitions 304 provide additional structural support to the sound attenuating cavities 212a-212c, which may be desirable in instances where the sound attenuation cell 302 is employed in a high vibration environment. In this example, the sound attenuation cell 302 includes three partitions 304: a first partition 304a, a second partition 304b and a third partition 304c. It should be understood, however, that the sound attenuation cell 302 may include any number of partitions 304. The partitions 304a-304c are each coupled to or integrally formed with the sound attenuating cavities 212a-212c. The partition 304a is also coupled to or integrally formed with the wall 204b, the base wall 206, the facesheet 208 and the backsheet 210 (FIG. 8). The partition 304b is also coupled to or integrally formed with the wall 204d, the facesheet 208 and the backsheet 210. The partition 304c is also coupled to or integrally formed with the wall 204f, the facesheet 208 and the backsheet 210.

In this example, the partitions 304a-304c are evenly spaced about a perimeter of the sound attenuation cell 302, however, the partitions 304a-304c may be positioned as needed. With additional reference to FIG. 8, the partitions 304a-304c are each solid, and extend from the respective wall 204b, 204d, 204f to proximate the longitudinal axis L10. Thus, the partitions 304a-304c define a solid wall that extends from the outer perimeter of the sound attenuation cell 302 through each of the sound attenuating cavities 212a-212c toward a center 302a of the sound attenuation cell 302 to provide additional structural support to each of the sound attenuating cavities 212a-212c. In this example, an inner end 306 of each of the partitions 304a-304c terminates in third undulating surface 306a. The third undulating surface is a mirror image of the first sidewall 230 about the longitudinal axis L10. The inner end 306 of each of the partitions 304a-304c generally extends far enough into the sound attenuation cell 302 to provide structural support.

Figure 9:
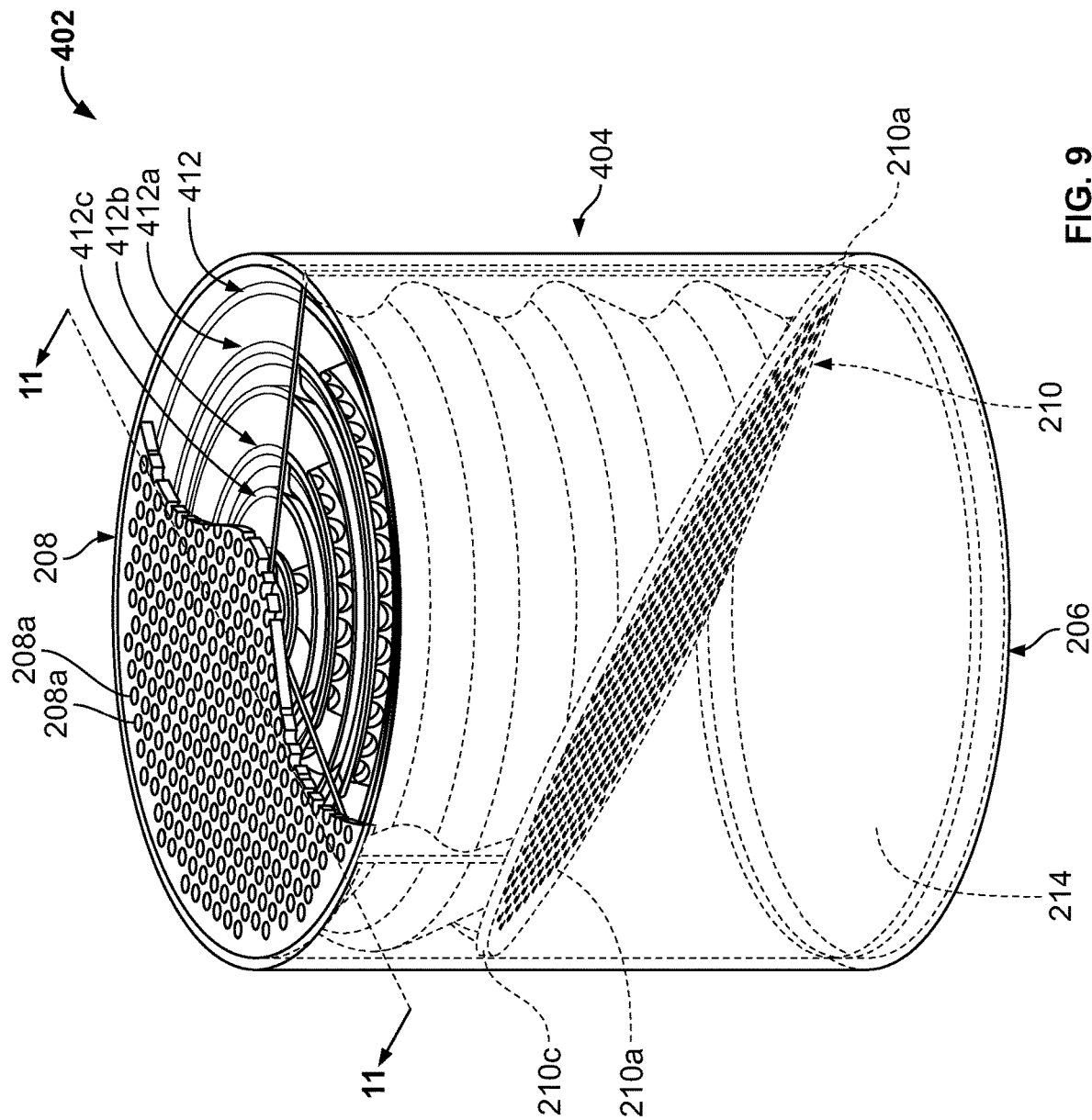
FIG. 9 is a perspective view of another exemplary sound attenuation cell for a sound attenuation panel for use with the gas turbine engine of FIG. 1 in accordance with various embodiments.

It should be noted that in other embodiments, the sound attenuation cells 202 may be configured differently to attenuate sound over the broad range of frequencies. For example, with reference to FIG. 9, a sound attenuation cell 402 is shown. As the sound attenuation cell 402 includes components that are the same or similar to components of the sound attenuation cell 202 discussed with regard to FIGS. 1-6, the same reference numerals will be used to denote the same or similar components. Further, while only one of the sound attenuation cell 402 is shown herein, it should be understood that one or more of the sound attenuation cells 402 may be coupled together or integrally formed into a sound attenuation panel 400 (FIG. 1), similar to the sound attenuation panel 200 discussed with regard to FIGS. 1-6. In this example, the sound attenuation cell 402 includes a wall 404, the base wall 206, the facesheet 208, the backsheet 210, at least one or a plurality of sound attenuating cavities 412. The sound attenuation cell 402 is integrally or monolithically formed to be one-piece from a metal or metal alloy, including, but not limited to such as aluminum, titanium, Inconel® produced by American Special Metals Corporation of Miami, Fla., United States of America, or high strength plastics including, but not limited to polyether ether ketone (PEEK) or polyetherimide; and is formed using additive manufacturing, including, but not limited to, direct metal laser sintering (DMLS) or fused deposition modeling (FDM). It should be noted that while the base wall 206, the facesheet 208 and the backsheet 210 are circular in the example of FIG. 9 instead of hexagonal in the example of FIGS. 1-6, the base wall 206, the facesheet 208 and the backsheet 210 are the same between the sound attenuation cell 202 and the sound attenuation cell 402 except for the shape.

The wall 404 surrounds the plurality of sound attenuating cavities 412. In one example, the wall 404 is cylindrical to define a cylinder. The wall 404 is solid or non-perforated. The wall 404 extends from the facesheet 208 to the base wall 206. In one example, the wall 404 is coupled to or integrally formed with the facesheet 208 and the base wall 206. The base wall 206 forms a second or bottom side of the sound attenuation cell 402, while the facesheet 208 forms a first or top side of the sound attenuation cell 402. The base wall 206 is circular, and is coupled to or integrally formed with the wall 404 so as to be opposite the facesheet 208. The base wall 206 is also coupled to or integrally formed with a portion of the plurality of sound attenuating cavities 412 and the backsheet 210. The base wall 206 is planar and is solid or non-perforated. The base wall 206 of the sound attenuation cell 402 cooperates with the backsheet 210 to define the chamber 214 in the sound attenuation cell 402.

The facesheet 208 is coupled to or integrally formed with the wall 404. The facesheet 208 is also coupled to or integrally formed with the plurality of sound attenuating cavities 412. While the facesheet 208 is shown partially broken away in FIG. 9, it will be understood that the facesheet 208 extends over the entirety of the sound attenuation cell 402 to be coupled to the entirety of the wall 404 to enclose the sound attenuation cell 402 similar to that shown in FIG. 2. The facesheet 208 is planar, and is perforated with the plurality of perforations or openings 208a that enable fluid, such as air, to enter into the plurality of sound attenuating cavities 412 of the sound attenuation cell 402. The facesheet 208 defines both the inlet and the outlet for the sound attenuation cell 402.

Figure 10:
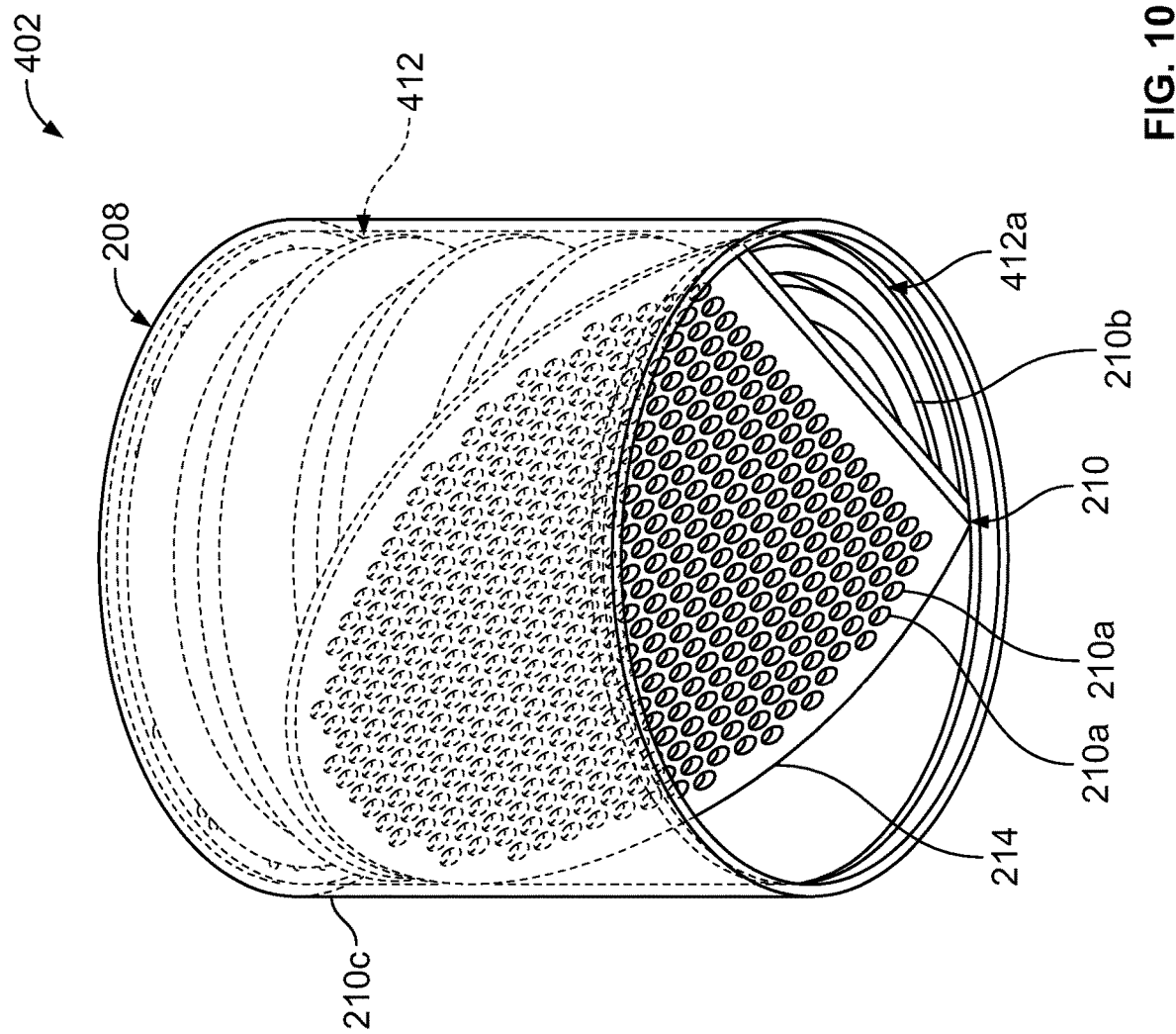
FIG. 10 is a bottom view of the sound attenuation cell of FIG. 9, in which a base wall associated with the sound attenuation cell has been removed.

With reference to FIG. 10, the backsheet 210 is coupled to or integrally formed with a portion of the plurality of sound attenuating cavities 412 at an end of the portion of the plurality of sound attenuating cavities 412 opposite the facesheet 208. In FIG. 10, the base wall 206 is removed for clarity. The backsheet 210 is also coupled to or integrally formed with the base wall 206 and the wall 404. The backsheet 210 is perforated with the plurality of perforations or openings 210a that enable fluid, such as air, to enter into the chamber 214 of the sound attenuation cell 402. The backsheet 210 may include any predetermined number of openings 210a to fluidly couple the plurality of sound attenuating cavities 412 to the chamber 214. In this example, with reference to FIG. 11, the backsheet 210 extends along the axis A, which is transverse or oblique to a longitudinal axis L20 of the sound attenuation cell 402. The facesheet 208 and the base wall 206 are each orientated to extend along an axis that is substantially perpendicular to the longitudinal axis L20. The backsheet 210 extends at the angle α defined between the backsheet 210 and the base wall 206. The volume of the chamber 214 increases from the first end 210b of the backsheet 210 to the second end 210c of the backsheet 210.

In this example, the backsheet 210 is defined the distance D from the first side 206a of the base wall 206. The first side 206a of the base wall 206 is opposite a second side 206b of the base wall 206. The backsheet 210 is positioned the distance D from the first side 206a of the base wall 206 to enable a portion of one of the plurality of sound attenuating cavities 412 to attenuate sound at a different frequency than a remainder of the plurality of sound attenuating cavities 412. In this regard, the distance D is predetermined such that the portion of one of the plurality of sound attenuating cavities 412 terminates at the base wall 206, while a remainder of the plurality of sound attenuating cavities 412 terminate at the backsheet 210. The varying of the lengths of the plurality of sound attenuating cavities 412 and the termination locations enables the sound attenuation cell 402 to attenuate the broad range of frequencies.

Figure 11:
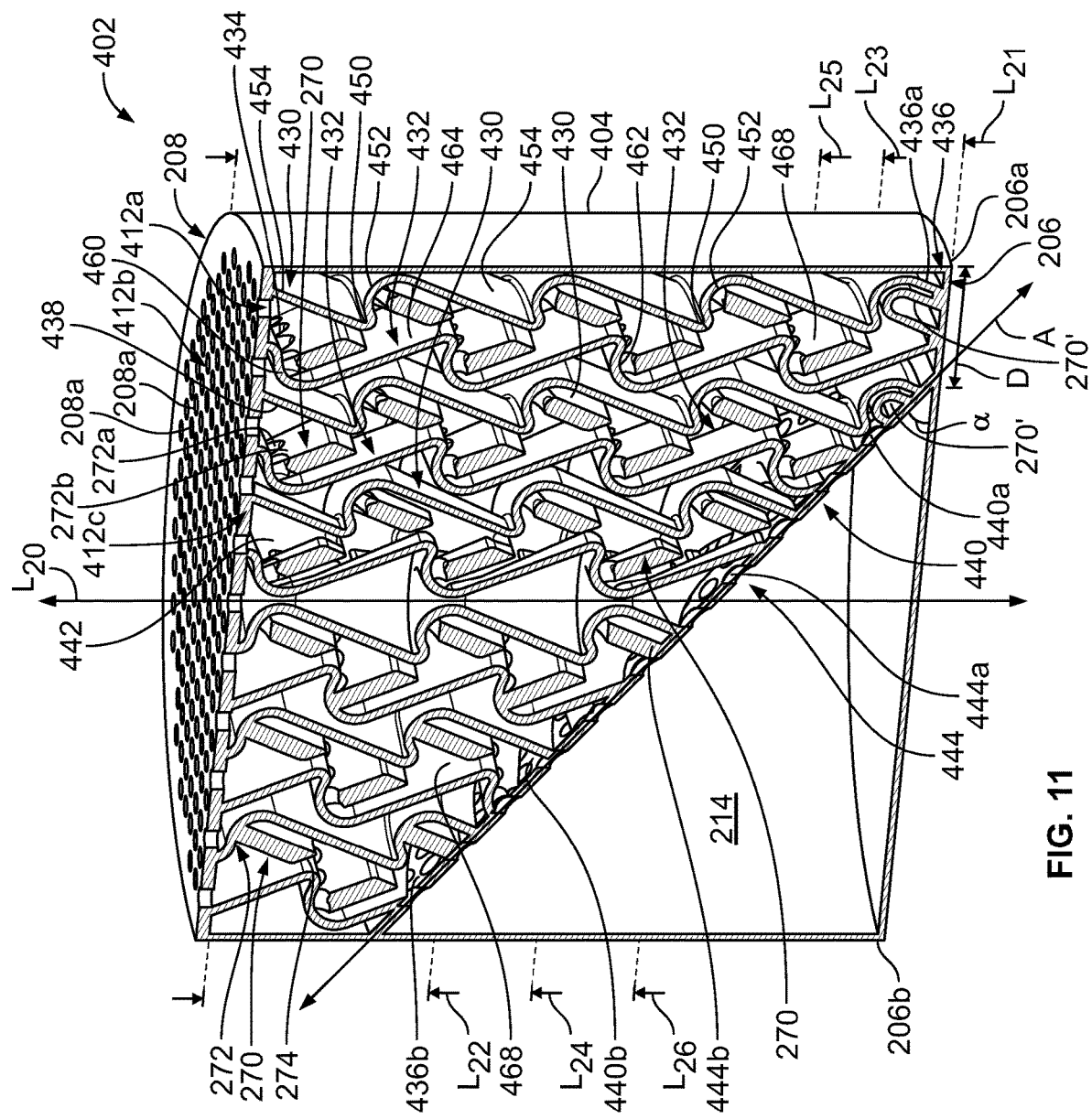
FIG. 11 is a cross-sectional view of the sound attenuation cell of FIG. 9, taken along line 11-11 of FIG. 9.

With continued reference to FIG. 11, the plurality of sound attenuating cavities 412 extend about the longitudinal axis L20. In this example, the sound attenuation cell 402 includes three of the plurality of sound attenuating cavities 412: a first sound attenuating cavity 412a, a second sound attenuating cavity 412b and a third sound attenuating cavity 412c. The second sound attenuating cavity 412b and the third sound attenuating cavity 412c are nested within an inner perimeter of the first sound attenuating cavity 412a. The third sound attenuating cavity 412c is nested within an inner perimeter of the second sound attenuating cavity 412b. Each of the sound attenuating cavities 412a-412c is concentric about the longitudinal axis L20. Each of the sound attenuating cavities 412a-412c includes a first sidewall 430 opposite a second sidewall 432. The second sidewall 432 is radially inward from the first sidewall 430 such that the first sidewall 430 defines a perimeter of the respective sound attenuating cavity 412a-412c. The first sound attenuating cavity 412a extends from a first end 434 coupled to or integrally formed with the facesheet 208 to a second end 436. A portion 436a of the second end 436 proximate the first side 206a of the base wall 206 terminates at the base wall 206, while a portion 436b of the second end 436 terminates at the backsheet 210. Stated another way, the orientation of the backsheet 210 results in the first sound attenuating cavity 412a having a first length L21 proximate the first side 206a of the base wall 206, and a second length L22 proximate the second side 206b of the base wall 206. Thus, the length of the first sound attenuating cavity 412a varies about the perimeter of the sound attenuation cell 402. In one example, the length of the first sound attenuating cavity 412a is reduced by about 75% between the first length L21 and the second length L22.

The second sound attenuating cavity 412b extends from a third end 438 coupled to or integrally formed with the facesheet 208 to a fourth end 440. A portion 440a of the fourth end 440 proximate the first side 206a of the base wall 206 terminates at the backsheet 210 proximate the first end 210b of the backsheet 210, and a portion 440b of the fourth end 440 terminates proximate the second end 210c of the backsheet 210. The orientation of the backsheet 210 results in the second sound attenuating cavity 412b having a third length L23 proximate the first side 206a of the base wall 206, and a fourth length L24 proximate the second side 206b of the base wall 206. Thus, the length of the second sound attenuating cavity 412b varies about the perimeter of the sound attenuation cell 402. In one example, the length of the second sound attenuating cavity 412b is reduced by about 50% between the third length L23 and the fourth length L24.

The third sound attenuating cavity 412c extends from a fifth end 442 coupled to or integrally formed with the facesheet 208 to a sixth end 444. A portion 444a of the sixth end 444 proximate the first side 206a of the base wall 206 terminates at the backsheet 210 proximate the first end 210b of the backsheet 210, and a portion 444b of the sixth end 444 terminates proximate the second end 210c of the backsheet 210. The orientation of the backsheet 210 results in the third sound attenuating cavity 412c having a fifth length L25 proximate the first side 206a of the base wall 206, and a sixth length L26 proximate the second side 206b of the base wall 206. Thus, the length of the third sound attenuating cavity 412c varies about the perimeter of the sound attenuation cell 402. In one example, the length of the third sound attenuating cavity 412c is reduced by about 10% between the fifth length L25 and the sixth length L26. In this example, each of the lengths L21-L26 is different.

As discussed, each of the sound attenuating cavities 412a-412c is defined by revolving the first sidewall 430 and the second sidewall 432 about the longitudinal axis L20. In this example, each of the sound attenuating cavities 412a-412c include the same first sidewall 430 and the same second sidewall 432, but the lengths of the first sidewall 430 and the second sidewall 432 are varied due to the orientation of the backsheet 210 along the axis A. Each of the first sidewalls 430 includes a plurality of first undulations 450, with each first undulation 450 separated by a respective first valley 452 of a plurality of first valleys 452. A first ramp surface 454 of a plurality of first ramp surfaces 454 is defined to interconnect a respective adjacent first valley 452 with an adjacent first undulation 450. The first undulation 450, the first valley 452 and the first ramp surface 454 alternate or repeat along the first sidewall 430 from the respective end 434, 438, 442 to the respective end 436, 440, 444 to form a first undulating surface. Generally, from the respective end 434, 438, 442, the first sidewall 430 includes one of the first ramp surfaces 454 coupled to or integrally formed with the facesheet 208, transitions to one of the first undulations 450 and then to one of the first valleys 452. This repeats until the first sidewall 430 terminates at the respective end 436, 440, 444.

Each of the second sidewalls 432 includes a plurality of second undulations 460, with each second undulation 460 separated by a respective second valley 462 of a plurality of second valleys 462. A second ramp surface 464 of a plurality of second ramp surfaces 464 is defined to interconnect a respective adjacent second valley 462 with an adjacent second undulation 460. The second undulation 460, the second valley 462 and the second ramp surface 464 alternate or repeat along the second sidewall 432 from the respective end 434, 438, 442 to the respective end 436, 440, 444 to form a second undulating surface. Generally, from the respective end 434, 438, 442, the second sidewall 432 includes one of the second valleys 462 coupled to or integrally formed with the facesheet 208, transitions to one of the second ramp surfaces 464 and then to one of the second undulations 460. This repeats until the second sidewall 432 terminates at the respective end 436, 440, 444.

Thus, generally, the first sidewall 430 is out of phase with or is axially misaligned with the second sidewall 432 such that the plurality of first undulations 450 are axially misaligned with or offset from the plurality of second undulations 460. The misalignment between the undulations 450, 460 defines a tortuous path 468 between the first sidewall 430 and the second sidewall 432. The tortuous path 468 causes the sound waves carried by the fluid F to continually be reflected into and between the first sidewall 430 and the second sidewall 432. This causes friction losses and vibration, which dampen the sound by converting the sound energy into heat.

In one example, each of the valleys 452, 462 includes the deflector 270 coupled to or integrally formed with the respective valley 452, 462 that extends about a perimeter of the respective one of the sound attenuating cavities 412a-412c. Each of the deflectors 270 includes the first deflector end 272 opposite the second deflector end 274. The first deflector end 272 is coupled to or integrally formed with the respective one of the valleys 452, 462, and the second deflector end 274 extends outwardly from the respective valley 452, 462 into the tortuous path 468 defined between the first sidewall 430 and the second sidewall 432. The first deflector end 272 includes the plurality of deflector openings 272a that are spaced apart about the periphery of the first deflector end 272. The bridges 272b couple the first deflector end 272 to the valley 452, 462. It should be noted that the sound attenuation cell 402 may also include partitions, similar to the partitions 304 discussed with regard to FIGS. 7 and 8, if desired. In addition, it should be noted that while the deflectors 270 are illustrated herein as being solid, in certain examples, as shown in FIG. 11, the first sidewall 430 may terminate at the respective end 436, 440, 444 with a hollow deflector 270'. The hollow deflector 270' may provide a weight savings. In other examples, the first sidewall 430 may terminate at the respective end 436, 440, 444 with the solid deflector 270.

Figure 12:
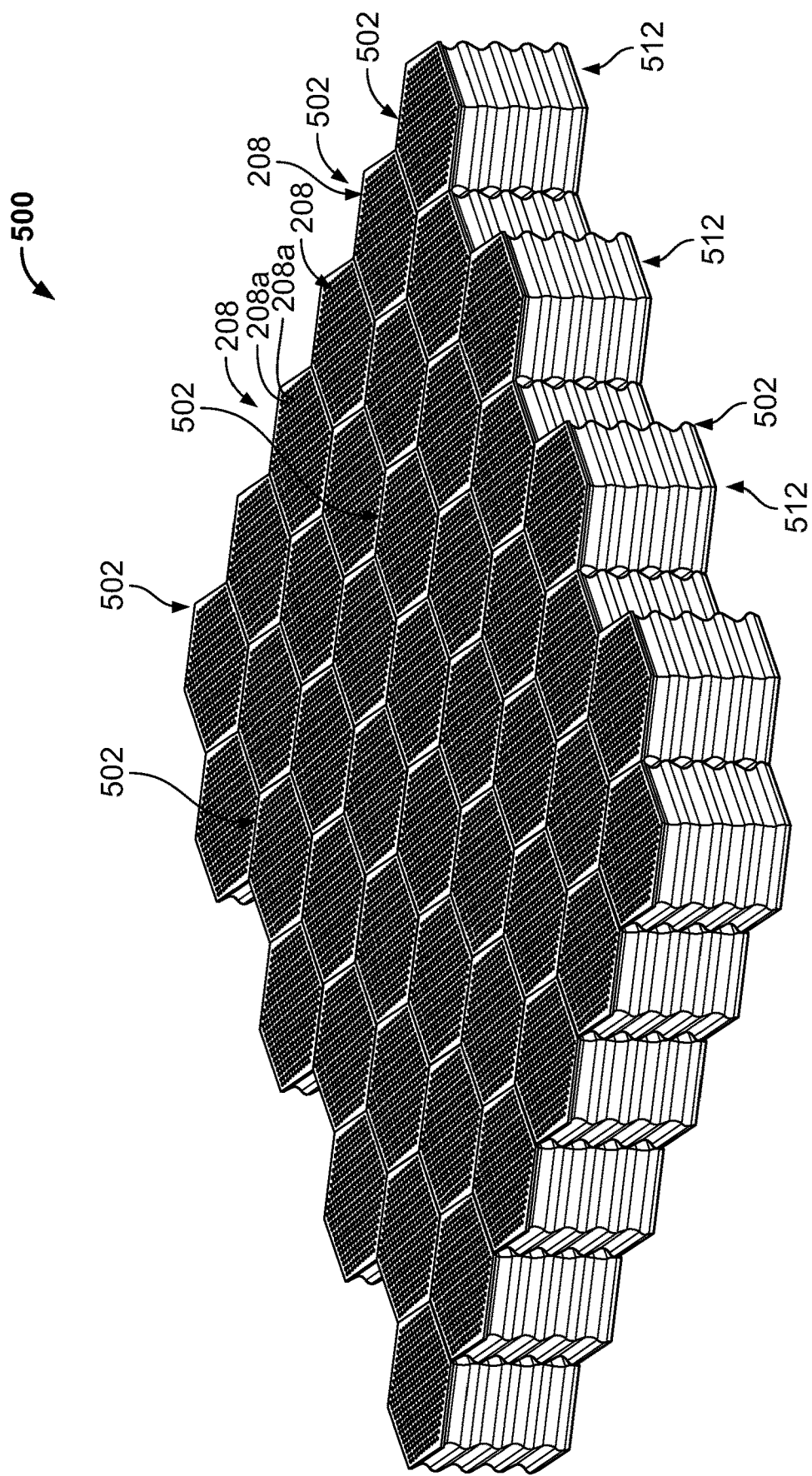
FIG. 12 is a perspective view of another exemplary sound attenuation panel having at least one exemplary sound attenuation cell for use with the gas turbine engine of FIG. 1 in accordance with various embodiments.

It should be noted that in other embodiments, the sound attenuation panel 200 may be configured differently to attenuate sound over the broad range of frequencies. For example, with reference to FIG. 12, a sound attenuation panel 500 is shown. As the sound attenuation panel 500 includes components that are the same or similar to components of the sound attenuation panel 200 discussed with regard to FIGS. 1-6, the same reference numerals will be used to denote the same or similar components. The sound attenuation panel 500 includes a plurality of the sound attenuation cells 502. It should be noted that the arrangement of the sound attenuation cells 502 to form the sound attenuation panel 500 shown in FIG. 12 is merely an example, as the sound attenuation cells 502 may be arranged in any configuration to form the sound attenuation panel 500. In this regard, the sound attenuation cells 502 may be arranged to form any desired polygonal shape for the sound attenuation panel 500, including, but not limited to, rectangular, square, triangular, trapezoid, etc. Moreover, the sound attenuation cells 502 may be arranged to form the sound attenuation panel 500 that has a shape configured for the particular use of the sound attenuation panel 500 within the gas turbine engine 100 (FIG. 1) such that the sound attenuation panel 500 may have a non-uniform or custom shape to fit the space available in the gas turbine engine 100. In this example, the sound attenuation panel 500 is composed of 48 sound attenuation cells 502, however, it should be understood that the sound attenuation panel 500 may comprise any number of sound attenuation cells 502, including a single sound attenuation cell 502.

In one example, the sound attenuation cells 502 are each additively manufactured to form the sound attenuation panel 500. In this example, each of the sound attenuation cells 502 is composed of a metal or metal alloy, such as aluminum, titanium, Inconel® produced by American Special Metals Corporation of Miami, Fla., United States of America, or high strength plastics including, but not limited to polyether ether ketone (PEEK) or polyetherimide; and is formed using additive manufacturing, including, but not limited to, direct metal laser sintering (DMLS) or fused deposition modeling (FDM). During the additive manufacture of the sound attenuation cells 502, the sound attenuation panel 500 may be formed by additively manufacturing adjacent ones of the sound attenuation cells 502 together such that the sound attenuation panel 500 is composed of one or more integrally formed sound attenuation cells 502. In other examples, the sound attenuation panel 500 may be formed by coupling discrete sound attenuation cells 502 together via welding, mechanical fasteners, etc.

Figure 13:
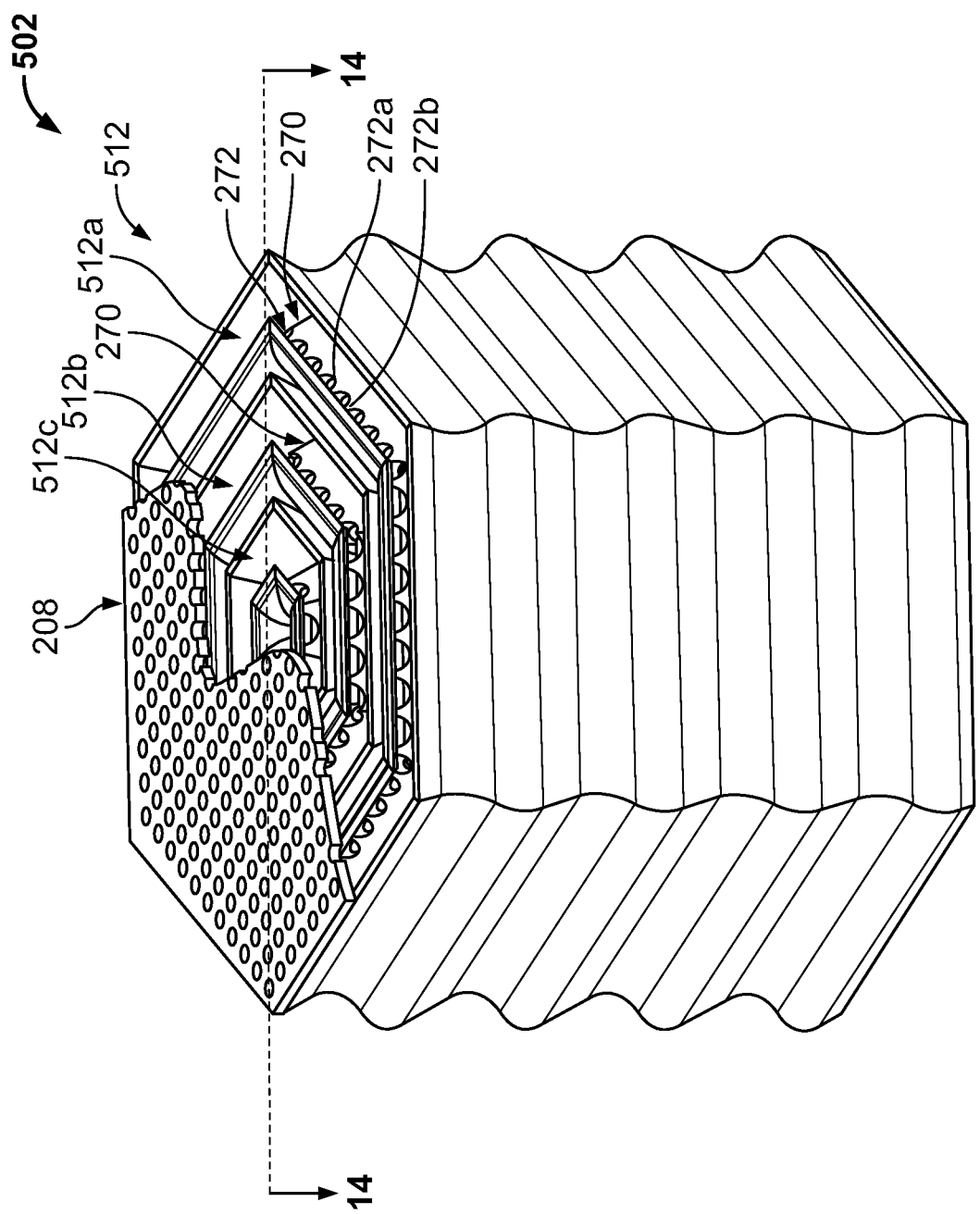
FIG. 13 is a perspective view of one sound attenuation cell of the sound attenuation panel of FIG. 12.

With reference to FIG. 13, one of the sound attenuation cells 502 is shown. As each of the sound attenuation cells 502 is the same, a single one of the sound attenuation cells 502 will be discussed in detail herein. In this example, each of the sound attenuation cells 502 includes the facesheet 208 and at least one or a plurality of sound attenuating cavities 512. As discussed, generally, each of the sound attenuation cells 502 is integrally or monolithically formed so as to be one-piece via additive manufacturing.

With reference back to FIG. 12, the facesheet 208 is coupled to or integrally formed with the plurality of sound attenuating cavities 512 to enclose an end of the plurality of sound attenuating cavities 512. The facesheet 208 is planar, and is perforated with the plurality of perforations or openings 208a that enable fluid, such as air, to enter into the plurality of sound attenuating cavities 512 of the sound attenuation cell 502. In this example, each of the sound attenuation cells 502 has the facesheet 208, however, in other embodiments, the sound attenuation panel 500 may be formed such that a single facesheet 208 extends over a plurality of the sound attenuation cells 502. The facesheet 208 defines the inlet and the outlet for the sound attenuation cells 502. In this regard, the plurality of sound attenuating cavities 512 not define an outlet, but rather are closed along an end of the plurality of sound attenuating cavities 512 opposite the facesheet 208. Fluid, such as air, enters the sound attenuation cells 502 via the facesheet 208, and exits the sound attenuation cells 502 via the facesheet 208.

Figure 14:
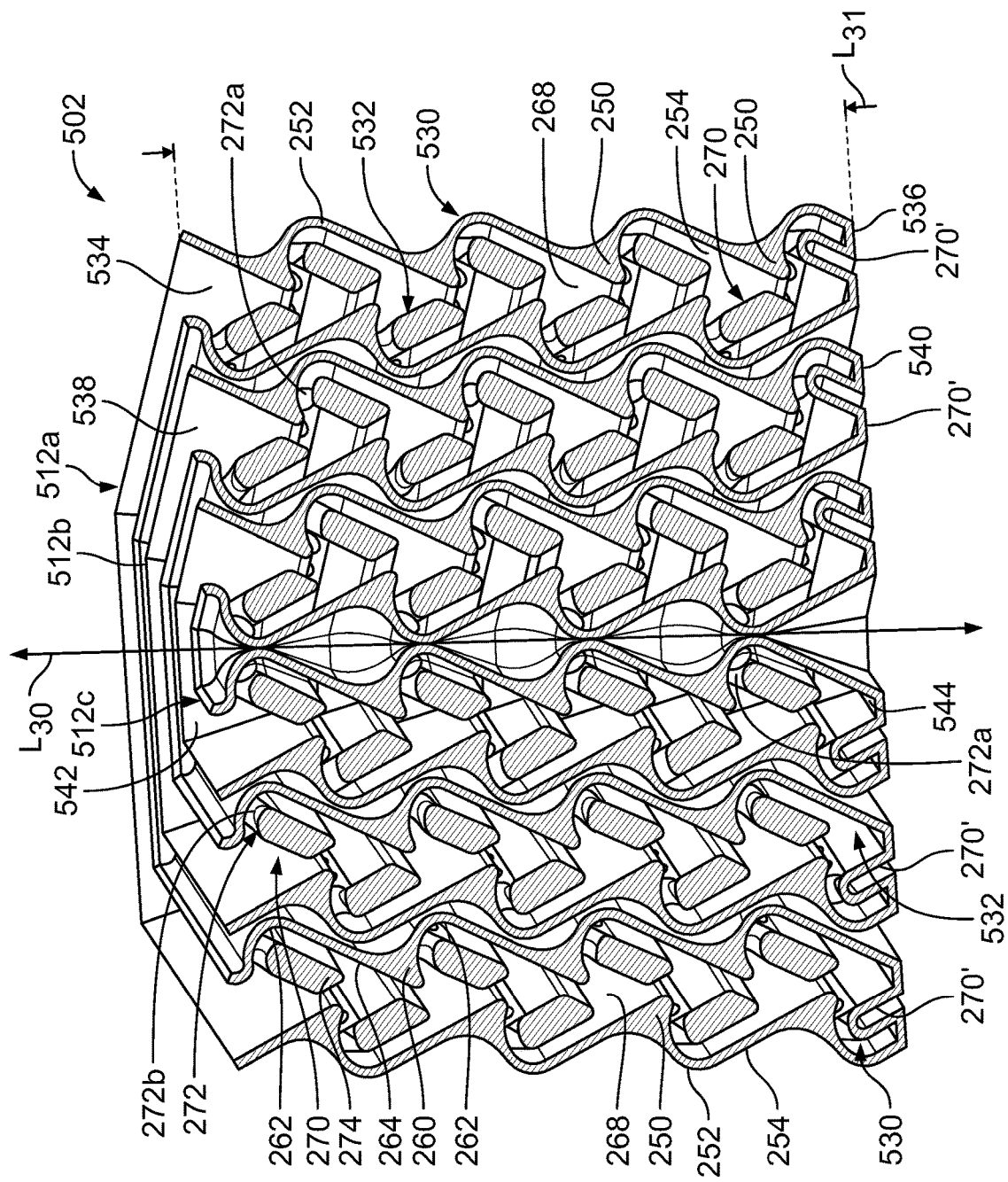
FIG. 14 is a cross-sectional view of the sound attenuation cell of FIG. 13, taken along line 14-14 of FIG. 13.

With reference to FIG. 14, the plurality of sound attenuating cavities 212 are symmetric about a longitudinal axis L30. In this example, the sound attenuation cells 502 each include three of the plurality of sound attenuating cavities 512: a first sound attenuating cavity 512a, a second sound attenuating cavity 512b and a third sound attenuating cavity 512c. The second sound attenuating cavity 512b and the third sound attenuating cavity 512c are nested within an inner perimeter of the first sound attenuating cavity 512a. The third sound attenuating cavity 512c is nested within an inner perimeter of the second sound attenuating cavity 512b. Each of the sound attenuating cavities 512a-512c is concentric about the longitudinal axis L30. Each of the sound attenuating cavities 512a-512c includes a first sidewall 530 opposite a second sidewall 532. The second sidewall 532 is radially inward from the first sidewall 530 such that the first sidewall 530 defines a perimeter of the respective sound attenuating cavity 512a-512c. For the first sound attenuating cavity 512a, the first sidewall 530 defines the perimeter of the sound attenuation cell 502. The first sound attenuating cavity 512a extends from a first end 534 coupled to or integrally formed with the facesheet 208 to a second end 536. The second end 536 is closed, such that the fluid is inhibited from exiting the sound attenuating cavity 512a at the second end 536. The second sound attenuating cavity 512b extends from a third end 538 coupled to or integrally formed with the facesheet 208 to a fourth end 540. The fourth end 540 is closed, such that the fluid is inhibited from exiting the sound attenuating cavity 512a at the fourth end 540. The third sound attenuating cavity 512c extends from a fifth end 542 coupled to or integrally formed with the facesheet 208 to a sixth end 544. The sixth end 544 is closed, such that the fluid is inhibited from exiting the sound attenuating cavity 512a at the sixth end 544. Thus, in this example, each of the sound attenuating cavities 512a-512c extend for the same length L31.

Each of the sound attenuating cavities 512a-512c is defined by extruding the first sidewall 530 and the second sidewall 532 about the longitudinal axis L30. In this example, each of the sound attenuating cavities 512a-512c include the same first sidewall 530 and the same second sidewall 532. Each of the first sidewalls 530 includes the plurality of first undulations 250, with each first undulation 250 separated by the respective first valley 252 of the plurality of first valleys 252. The first sloped surface 254 of the plurality of first sloped surfaces 254 is defined to interconnect the respective adjacent first valley 252 with an adjacent first undulation 250 to form the first undulating surface. Generally, from the respective end 534, 538, 542, the first sidewall 530 includes one of the first sloped surfaces 254 coupled to or integrally formed with the facesheet 208, transitions to one of the first undulations 250 and then to one of the first valleys 252. This repeats until the first sidewall 530 terminates at the respective end 536, 540, 544.

Each of the second sidewalls 532 includes the plurality of second undulations 260, with each second undulation 260 separated by the respective second valley 262 of the plurality of second valleys 262. The second sloped surface 264 of the plurality of second sloped surfaces 264 is defined to interconnect a respective adjacent second valley 262 with the adjacent second undulation 260 to form the second undulating surface. Generally, from the respective end 534, 538, 542, the second sidewall 532 includes one of the second valleys 262 coupled to or integrally formed with the facesheet 208, transitions to one of the second sloped surfaces 264 and then to one of the second undulations 260. This repeats until the second sidewall 532 terminates at the respective end 536, 540, 544. Thus, generally, the first sidewall 530 is out of phase with or is axially misaligned with the second sidewall 532 such that the plurality of first undulations 250 are axially misaligned with or offset from the plurality of second undulations 260. The misalignment between the undulations 250, 260 defines the tortuous path 268 between the first sidewall 530 and the second sidewall 532.

Each of the valleys 252, 262 includes the deflector 270 coupled to or integrally formed with the respective valley 252, 262 that extends about a perimeter of the respective one of the sound attenuating cavities 512a-512c. Each of the deflectors 270 includes the first deflector end 272 opposite the second deflector end 274. The first deflector end 272 is coupled to or integrally formed with the respective one of the valleys 252, 262, and the second deflector end 274 extends outwardly from the respective valley 252, 262 into the tortuous path 268 defined between the first sidewall 530 and the second sidewall 532. In this example, the first deflector end 272 includes the plurality of deflector openings 272a that are spaced apart about the periphery of the first deflector end 272. The bridges 272b that couple the first deflector end 272 to the valley 252, 262. It should be noted that while the deflectors 270 are illustrated herein as being solid, in certain examples, as shown in FIG. 14, the first sidewall 530 may terminate at the respective end 536, 540, 544 with a hollow deflector 270'. The hollow deflector 270' may provide a weight savings. In other examples, the first sidewall 530 may terminate at the respective end 536, 540, 544 with the solid deflector 270.

Generally, once installed in the gas turbine engine 100, each of the sound attenuation cells 202, 302, 402, 502 receive sound through the facesheet 208, which is directed into the respective sound attenuating cavities 212, 412, 512. Depending on where the sound enters the facesheet 208, the sound either travels down the sound attenuating cavity 212, 512 to the respective end 236, 436, 536, 540, 544 or travels down the sound attenuating cavity 212, 412 to the backsheet 210 and into the chamber 214. Once the sound has passed one-way through the sound attenuating cavity 212, 412, 512, the sound is deflected back towards the facesheet 208. The shape of the first undulating surface formed by the first sidewall 230, 430 and the second undulating surface formed by the second sidewall 232, 432 causes the sound to be continually turned on itself by the multiple deflectors 270 that line the tortuous path 268, 468. This continual turning of the sound or the fluid F carrying the sound on itself causes large pressure loss, which in turn, causes the sound to be suppressed. The varying lengths of the sound attenuating cavities 212, 412 caused by the backsheet 210 allows the sound attenuation over the broad frequency range, and the backsheet 210 also assists in breaking up the sound waves.

Thus, the sound attenuation cells 202, 302, 402, 502 provide for the attenuation of sound at the broad range of frequencies, which reduces cost and complexity associated with sound suppression in a gas turbine engine 100 (FIG. 1). Generally, each sound attenuating cavity 212, 412, 512 of the sound attenuation cells 202, 302, 402, 502 forms a one-way valve, which permits the fluid F, such as air, to enter and exit at the same end with the sound being attenuated as the fluid travels down and back through the one-way valve. The sound attenuation cells 202, 302, 402, 502 may be coupled together or integrally formed together, via additive manufacturing, including, but not limited to DMLS or FMS, to form sound attenuating panels, such as the sound attenuation panels 200, 300, 400, 500, which may be of a custom size and shape for placement within the gas turbine engine 100 (FIG. 1). In addition, the use of a metal or metal alloy for the sound attenuation cells 202, 302, 402, 502 enables the attenuation of the broad range of frequencies with non-foam based sound attenuating panels, which enables the sound attenuation cells 202, 302, 402, 502 to be employed in a variety of environments that are not conducive to the use of a foam-based structure. The sound attenuation cells 202, 302, 402, 502 also enable the attenuation of the broad range of frequencies with a reduced weight due to the nested structure of the sound attenuating cavities 212, 412, 512. In addition, the chamber 214 also reduces an overall weight of the sound attenuation cells 202, 302, 402 by providing the empty or void space, and also reduces material costs associated with the sound attenuation cells 202, 302, 402.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A sound attenuating cell, comprising:
a first sound attenuating cavity defined between a first sidewall and a second sidewall, the first sidewall opposite the second sidewall, the first sidewall and the second sidewall extending along a longitudinal axis, the first sidewall including a first undulating surface and the second sidewall including a second undulating surface, with a deflector coupled to the first undulating surface, the deflector extending from the first undulating surface toward the second undulating surface, the first undulating surface axially misaligned with the second undulating surface to define a tortuous path between the first sidewall and the second sidewall, the first sound attenuating cavity having a first end and a second end, the first end opposite the second end, with an inlet and an outlet of the first sound attenuating cavity defined at the first end; and
a second sound attenuating cavity nested within the first sound attenuating cavity.

2. The sound attenuating cell of claim 1, wherein the deflector includes a first deflector end and a second deflector end, the first deflector end coupled to the first undulating surface and the first deflector end defines a plurality of openings spaced apart about a periphery of the first deflector end.

3. The sound attenuating cell of claim 2, wherein the deflector is cantilevered relative to the first undulating surface and the second deflector end extends toward the second undulating surface.

4. The sound attenuating cell of claim 1, wherein the first undulating surface includes a plurality of first undulations, a plurality of first valleys and a plurality of first sloped surfaces that alternate to define the first undulating surface, and the deflector is coupled to at least one first valley of the plurality of first valleys of the first undulating surface.

5. The sound attenuating cell of claim 1, further comprising a perforated facesheet coupled to the first end.

6. The sound attenuating cell of claim 1, wherein the first sound attenuating cavity and the second sound attenuating cavity extend about the longitudinal axis of the sound attenuating cell.

7. The sound attenuating cell of claim 6, wherein the second sound attenuating cavity has a third end and a fourth end, the third end opposite the fourth end, with a second inlet and a second outlet defined at the third end.

8. The sound attenuating cell of claim 7, further comprising a perforated backsheet coupled to at least a portion of the second end of the first sound attenuating cavity and the fourth end of the second sound attenuating cavity.

9. The sound attenuating cell of claim 8, wherein the sound attenuating cell includes a plurality of walls that cooperate to surround the first sound attenuating cavity and the second sound attenuating cavity, a base wall coupled to each of the plurality of walls, and the backsheet is coupled to the portion of the second end of the first sound attenuating cavity and the fourth end of the second sound attenuating cavity such that a chamber is defined between the backsheet and the base wall.

10. The sound attenuating cell of claim 9, wherein the backsheet is coupled to the portion of the second end of the first sound attenuating cavity and the fourth end of the second sound attenuating cavity to extend along an axis that is transverse to the longitudinal axis of the sound attenuating cell to define the chamber.

11. The sound attenuating cell of claim 1, wherein the first sound attenuating cavity and the second sound attenuating cavity are substantially symmetric about the longitudinal axis of the sound attenuating cell.

12. The sound attenuating cell of claim 1, further comprising a third sound attenuating cavity nested within the second sound attenuating cavity.

13. The sound attenuating cell of claim 1, wherein the first sidewall of the first sound attenuating cavity defines a perimeter of the sound attenuating cell.

14. The sound attenuating cell of claim 1, wherein the second end of the first sound attenuating cavity is closed, the second sound attenuating cavity has a third end and a fourth end, the third end opposite the fourth end and the fourth end is closed such that a second inlet and a second outlet of the second sound attenuating cavity is defined at the third end.

15. The sound attenuating cell of claim 1, further comprising at least one partition that extends through at least the first sound attenuating cavity and the second sound attenuating cavity.

16. A sound attenuating cell, comprising:
 a first sound attenuating cavity defined between a first sidewall and a second sidewall, the first sidewall opposite the second sidewall, the first sidewall including a first undulating surface and the second sidewall including a second undulating surface, with a deflector coupled to the first undulating surface, the deflector extending from the first undulating surface toward the second undulating surface, the first undulating surface axially offset from the second undulating surface to define a tortuous path between the first sidewall and the second sidewall, the first sound attenuating cavity having a first end and a second end, the first end opposite the second end, with an inlet and an outlet of the first sound attenuating cavity defined at the first end; and
 a second sound attenuating cavity nested within the first sound attenuating cavity, and a length of the first sound attenuating cavity and the second sound attenuating cavity varies about a perimeter of the sound attenuating cell.

17. A sound attenuating panel for a gas turbine engine, comprising:
 at least one sound attenuating cell, the at least one sound attenuating cell including a perforated facesheet, a first sound attenuating cavity defined between a first sidewall and a second sidewall, the first sidewall opposite the second sidewall, the first sidewall including a first undulating surface and the second sidewall including a second undulating surface, with a deflector coupled to the first undulating surface that extends from the first undulating surface toward the second undulating surface, the deflector is cantilevered relative to the first undulating surface, the deflector includes a first deflector end and a second deflector end, the first deflector end coupled to the first undulating surface, and the first deflector end defines a plurality of openings spaced apart about a periphery of the first deflector end, the first undulating surface axially offset from the second undulating surface to define a tortuous path between the first sidewall and the second sidewall, the first sound attenuating cavity having a first end coupled to the facesheet and a second end, the first end opposite the second end, with an inlet and an outlet defined at the facesheet; and
 a second sound attenuating cavity nested within an inner perimeter of the first sound attenuating cavity, the second sound attenuating cavity having a second inlet and a second outlet defined at the facesheet.

18. The sound attenuating panel of claim 17, wherein the at least one sound attenuating cell includes a plurality of walls that cooperate to surround the first sound attenuating cavity and the second sound attenuating cavity, and a base wall is coupled to each of the plurality of walls opposite the facesheet.

19. The sound attenuating panel of claim 18, further comprising a perforated backsheet coupled to a portion of the second end of the first sound attenuating cavity and an end of the second sound attenuating cavity to extend along an axis that is transverse to a longitudinal axis of the at least one sound attenuating cell to define a chamber between the backsheet and the base wall.

\* \* \* \* \*